US012706498B2

(12) United States Patent
Kawato et al.

(10) Patent No.: US 12,706,498 B2
(45) Date of Patent: Aug. 11, 2026

(54) ROTARY ELECTRIC MACHINE

(71) Applicant: AISIN CORPORATION, Kariya (JP)

(72) Inventors: Satoko Kawato, Kariya (JP); Satoshi Murakami, Kariya (JP); Naoto Saito, Kariya (JP); Yasunobu Shiotsuki, Kariya (JP); Mitsumasa Anzawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 212 days.

(21) Appl. No.: 18/690,909

(22) PCT Filed: Oct. 25, 2022

(86) PCT No.: PCT/JP2022/039793
§ 371 (c)(1),
(2) Date: Mar. 11, 2024

(87) PCT Pub. No.: WO2023/074705
PCT Pub. Date: May 4, 2023

(65) Prior Publication Data

US 2024/0388152 A1 Nov. 21, 2024

(30) Foreign Application Priority Data

Oct. 26, 2021 (JP) ................................ 2021-174880
Oct. 26, 2021 (JP) ................................ 2021-174881

(51) Int. Cl.
*H02K 1/32* (2006.01)
*H02K 1/26* (2006.01)
*H02K 7/00* (2006.01)

(52) U.S. Cl.
CPC ............... *H02K 1/32* (2013.01); *H02K 7/003* (2013.01); *H02K 1/26* (2013.01); *H02K 2209/00* (2013.01)

(58) Field of Classification Search
CPC ............ H02K 1/32; H02K 7/003; H02K 1/26; H02K 2209/00; H02K 9/12; H02K 9/00
(Continued)

(56) References Cited

U.S. PATENT DOCUMENTS

2019/0229582 A1 7/2019 Ito et al.
2019/0296600 A1 9/2019 Mikati et al.

FOREIGN PATENT DOCUMENTS

CN 214069749 U * 8/2021
EP 3675332 A1 * 7/2020 ............... H02K 9/19
(Continued)

OTHER PUBLICATIONS

Nov. 5, 2024 Extended Search Report issued in European Patent Application No. 22887031.7.
(Continued)

*Primary Examiner* — Jose A Gonzalez Quinones
(74) *Attorney, Agent, or Firm* — Oliff PLC

(57) ABSTRACT

A rotary electric machine includes a stator including teeth around which coils are wound, a rotor including a shaft of a hollow shape and a core member around which field windings are wound, the core member being coaxially fixed to the shaft, the rotor being disposed coaxially with the stator with a gap provided radially between the rotor and the stator, and a coolant flow passage structure communicating with a pump that force-feeds a liquid coolant, in which the field windings include coil turns located at axial ends of the rotor, the coolant flow passage structure includes a first coolant flow passage communicating with the interior of the shaft, and the first coolant flow passage extends radially outward from the shaft, passing axially inside the coil turns, and has a discharge opening radially facing the stator at a radially outer end.

12 Claims, 20 Drawing Sheets

(58) Field of Classification Search
USPC .............................. 310/52, 54, 58, 59, 60 A
See application file for complete search history.

(56) References Cited

FOREIGN PATENT DOCUMENTS

| | | | |
|---|---|---|---|
| JP | H07-027270 | A | 1/1995 |
| JP | 2006-353051 | A | 12/2006 |
| JP | 2012-110137 | A | 6/2012 |
| JP | 2016-005305 | A | 1/2016 |
| JP | 2019-129608 | A | 8/2019 |
| JP | 2020-039230 | A | 3/2020 |
| JP | 6725076 | B2 | 7/2020 |
| JP | 2020-128816 | A | 8/2020 |
| JP | 2020-188625 | A | 11/2020 |
| JP | 2021-072714 | A | 5/2021 |
| WO | 2011/155277 | A1 | 12/2011 |
| WO | 2018/095842 | A1 | 5/2018 |

OTHER PUBLICATIONS

Jan. 17, 2023 International Search Report issued in International Patent Application No. PCT/JP2022/039793.

* cited by examiner 100A
2
253
252
250
254
84
Q4
Q5
3221
8610A
3161
861A
2502
82
81
243
SP2
810
72
70
71
241
2411
2431
85
314
316
310
312
317A
313A
3120
8311A
8312A
3145 (83)
SP1
317A
322
321
320
X2
X
X1
8620A
3222
862A
1A
3162
240
SP3
3181
3182
318
9
Z1
Z
Z2
31
(7)
A1
P1
80
(8)

100B
2
250
252
253
254
2502
318
3181
3182
SP3
9
240
1B
3162
SP1
3222
3221
3161
241
72
81
82
80
(8)
243
SP2
810
2431
85
2411
314
316
310
312
3145 (83)
8312B
8311B
70
71
3120
321
322
320
Q6
31
(7)
A1
Z1
Z
Z2
X1
X
X2

100C
1C
240
252C (2C)
3222
312C (310C)
SP1
322
320
321
250C (2C)
3124C
3145 (83)
8312B
8311B
3120
X2
X
X1
Z1
Z
Z2
70
71
315
3221
241
72
2411
314
312C
310C
2502C
85
81C
243
810
2431
87C
SP2
31 (7)
A1
80 (8)

ROTARY ELECTRIC MACHINE

TECHNICAL FIELD

The present disclosure relates to a rotary electric machine.

BACKGROUND ART

As a method of cooling field windings of a rotary electric machine by a liquid coolant such as oil, a technique is known in which a liquid coolant is supplied into a rotor shaft of a hollow shape, and the liquid coolant supplied into the rotor shaft is supplied from radial holes in the rotor shaft to axially central portions of field windings (see, for example, Patent Literature 1).

As another cooling method, a technique is known in which a liquid coolant is ejected onto the axial ends of field windings (coil turns axially protruding from end faces of a rotor core) from axially outside (see, for example, Patent Literature 2).

CITATIONS LIST

Patent Literature

Patent Literature 1: JP 2020-39230 A
Patent Literature 2: WO 2018/095842 A

SUMMARY OF DISCLOSURE

Technical Problems

However, by conventional cooling methods as described above, it is difficult to effectively cool a stator (in particular, the coil ends of stator coils) in a wound field rotary electric machine in which the stator is located radially outside the axial ends of field windings.

The present disclosure is intended to effectively cool a stator in a wound field rotary electric machine in which the stator is located radially outside the axial ends (coil turns) of field windings.

Solutions to Problems

According to an aspect of the present disclosure, a rotary electric machine is provided which includes:

a stator including teeth around which coils are wound;

a rotor including a shaft of a hollow shape and a core member around which field windings are wound, the core member being coaxially fixed to the shaft, the rotor being disposed coaxially with the stator with a gap provided radially between the rotor and the stator; and a coolant flow passage structure communicating with a pump that force-feeds a liquid coolant, in which the field windings include coil turns located at axial ends of the rotor, the coolant flow passage structure includes a first coolant flow passage communicating with the interior of the shaft, and the first coolant flow passage extends radially outward from the shaft, passing axially inside the coil turns, and has a discharge opening radially facing the stator at a radially outer end.

Advantageous Effects of Disclosure

The present disclosure allows effective cooling of a stator in a wound field rotary electric machine in which the stator is located radially outside the axial ends of field windings.

DESCRIPTION OF EMBODIMENTS

Figure 1:
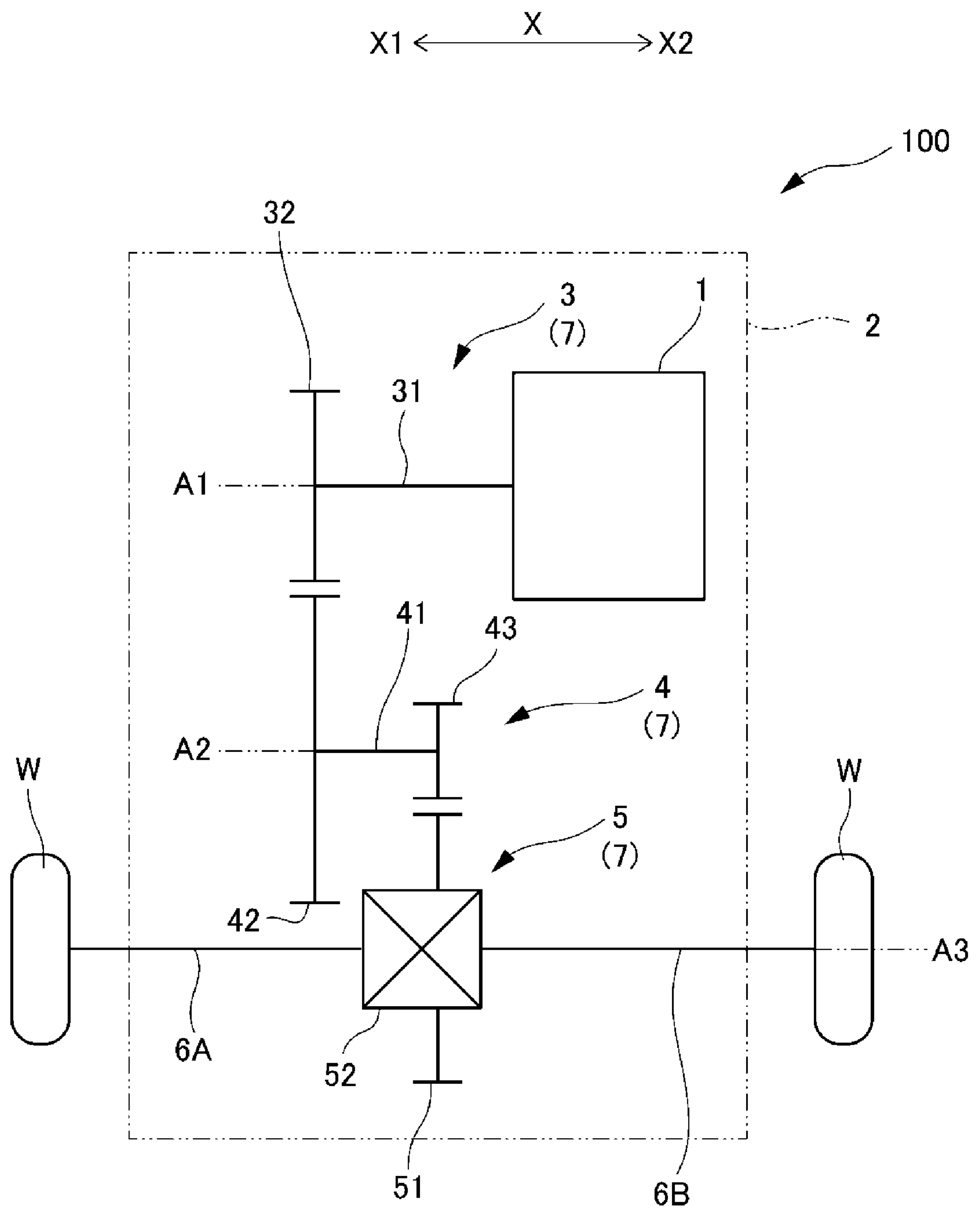
FIG. 1 is a skeleton diagram illustrating a general outline of a vehicle drive unit.

Hereinafter, embodiments will be described in detail with reference to the accompanying drawings. Note that dimensional ratios in the drawings are merely an example, and the present disclosure is not limited to this. Shapes etc. in the drawings may be partly exaggerated for convenience of description.

The following first describes a general outline of a vehicle drive unit 100, and then describes details of features of the present embodiment (a first embodiment).

FIG. 1 is a skeleton diagram illustrating a general outline of the vehicle drive unit 100. In FIG. 1, the X direction and the X1 side and the X2 side along the X direction are defined. The X direction is parallel to the direction of a first axis A1 (hereinafter, also referred to as an "axial direction").

In an example illustrated in FIG. 1, the vehicle drive unit 100 includes a rotary electric machine 1 and a power transmission system 7.

The rotary electric machine 1 functions as a drive source for wheels W. In a modification, in addition to the rotary electric machine 1, an engine (internal combustion engine) may be used as a drive source for the wheels W. In the present embodiment, the rotary electric machine 1 is a wound field rotary electric machine as described below, but may use permanent magnets in addition to field windings.

The power transmission system 7 is provided in a power transmission path connecting the rotary electric machine 1 and the wheels W. The power transmission system 7 includes an input member 3, a counter gear mechanism 4, and a differential gear mechanism 5.

The input member 3 includes an input shaft 31 and an input gear 32. The input shaft 31 is a rotary shaft member that rotates about the first axis A1. The input gear 32 is a gear that transmits rotary torque (driving force) from the rotary electric machine 1 to the counter gear mechanism 4. The input gear 32 is provided on the input shaft 31 of the input member 3 to rotate integrally with the input shaft 31 of the input member 3.

The counter gear mechanism 4 is disposed between the input member 3 and the differential gear mechanism 5 in the power transmission path. The counter gear mechanism 4 includes a counter shaft 41, a first counter gear 42, and a second counter gear 43.

The counter shaft 41 is a rotary shaft member that rotates about a second axis A2. The second axis A2 extends parallel to the first axis A1. The first counter gear 42 is an input element of the counter gear mechanism 4. The first counter gear 42 meshes with the input gear 32 of the input member 3. The first counter gear 42 is coupled to the counter shaft 41 to rotate integrally with the counter shaft 41.

The second counter gear 43 is an output element of the counter gear mechanism 4. In the present embodiment, as an example, the second counter gear 43 is formed to have a smaller diameter than the first counter gear 42. The second counter gear 43 is provided on the counter shaft 41 to rotate integrally with the counter shaft 41.

The differential gear mechanism 5 is disposed on a third axis A3 as its rotation axis. The third axis A3 extends parallel to the first axis A1. The differential gear mechanism 5 distributes a driving force transmitted from the rotary electric machine 1 side to left and right output members 6A and 6B. The differential gear mechanism 5 includes a differential input gear 51. The differential input gear 51 meshes with the second counter gear 43 of the counter gear mechanism 4. The differential gear mechanism 5 includes a differential case 52. In the differential case 52, a pinion shaft, a pinion gear, left and right side gears, etc. are accommodated. The left and right side gears are coupled to the left and right output members 6A and 6B, respectively, to rotate integrally with them.

The left and right output members 6A and 6B are coupled to the left and right wheels W, respectively, to drive them. The left and right output members 6A and 6B transmit the driving force distributed by the differential gear mechanism 5 to the respective wheels W. The left and right output members 6A and 6B may include two or more members.

Thus, the rotary electric machine 1 drives the wheels W via the power transmission system 7. Note that details of the power transmission system 7 are arbitrary as long as the rotary electric machine 1 is provided. For example, a rotor shaft 314 of the rotary electric machine 1 may be a member directly coupled to the wheels W. In another embodiment, another power transmission system such as a planetary gear system may be used, or a power transmission system including a speed increasing mechanism may be used.

Figure 2:
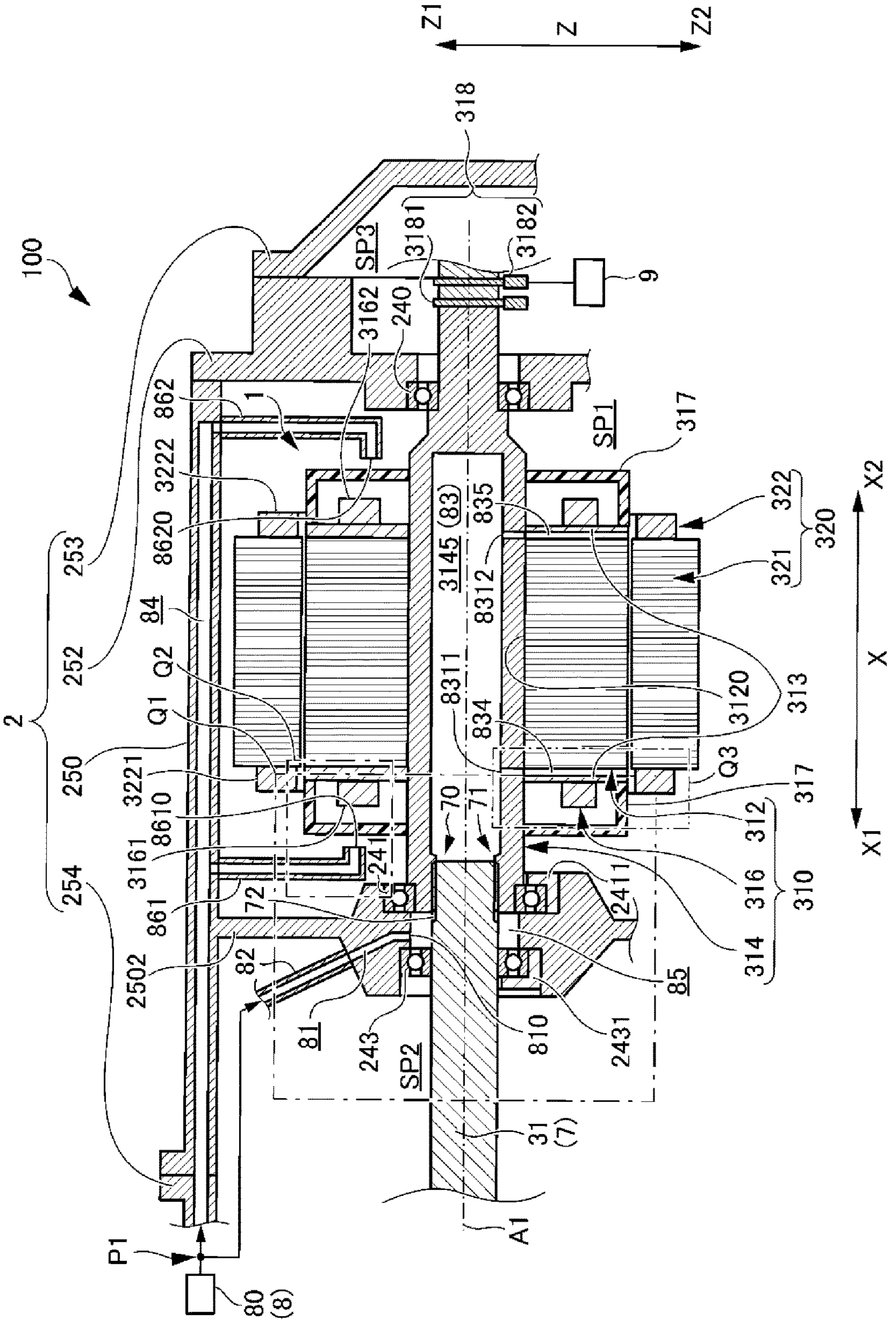
FIG. 2 is a schematic cross-sectional view illustrating a general outline of a rotary electric machine according to a first embodiment.
Figure 3:
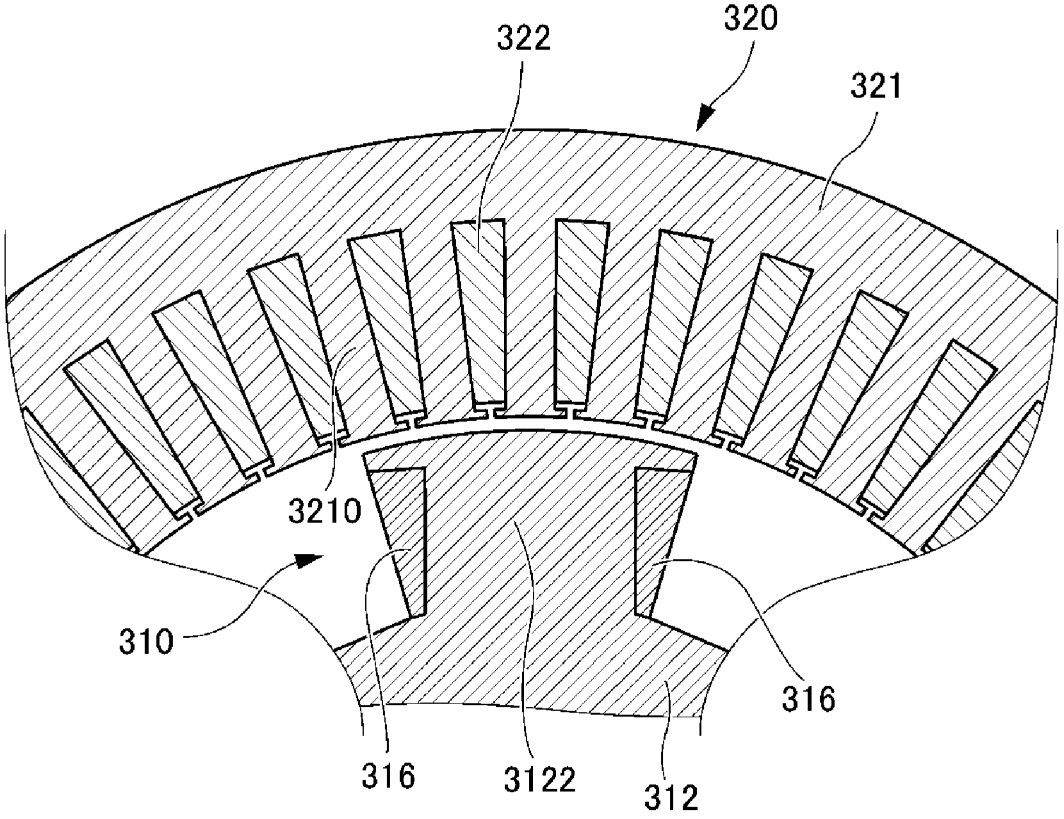
FIG. 3 is a schematic cross-sectional view illustrating part of a cross section of the rotary electric machine.

FIG. 2 is a schematic cross-sectional view illustrating a general outline of the entire rotary electric machine 1, and is a cross-sectional view taken along a plane including the rotation axis of the rotary electric machine 1. FIG. 3 is a schematic cross-sectional view illustrating part of a cross section of the rotary electric machine 1, and is a cross-sectional view taken along a plane perpendicular to the rotation axis of the rotary electric machine 1. In FIG. 2, the Z direction and the Z1 side and the Z2 side along the Z direction are defined. Here, the Z direction corresponds to the vertical direction, and the Z1 side corresponds to the upper side. Note that the Z direction does not necessarily need to strictly coincide with the vertical direction.

In FIG. 2, part of a case 2 is omitted, and the input shaft 31, an oil supply device 8, a controller 9, etc. are also illustrated as components of the vehicle drive unit 100 other than the rotary electric machine 1. In the present embodiment, as illustrated in FIG. 2, the input shaft 31 is a solid rotary shaft member. However, a hollow portion may be formed only in a portion of the input shaft 31 (such as an end portion on the X-direction X side), or a hollow portion for an oil passage may be formed (see a tubular passage 87A in FIG. 11).

The rotary electric machine 1 includes a rotor 310 and a stator 320 in the case 2.

The case 2 may be formed of, for example, aluminum or the like. The case 2 can be formed by casting or the like. The case 2 may be formed by a combination of a plurality of case members.

In the present embodiment, the case 2 includes a motor case 250, a first cover member 252, a second cover member 253, and a gear case member 254. As described above, the case 2 accommodates the rotary electric machine 1 and the power transmission system 7. As schematically illustrated in FIG. 2, the case 2 may further accommodate slip rings 318 described later and others.

The motor case 250 forms a motor housing chamber SP1 in which the main body of the rotary electric machine 1 is housed. The motor case 250 is formed to have a peripheral wall surrounding the radial outside of the rotary electric machine 1. The motor case 250 may be formed by coupling a plurality of members. The motor case 250 may be integrated with the gear case member 254 on the X-direction X1 side.

An in-case oil passage 84 is formed in the motor case 250. In an example illustrated in FIG. 2, the in-case oil passage 84 extends in the axial direction. The in-case oil passage 84 communicates with an oil pump 80 of the oil supply device 8 described later and communicates with oil passage pipes 861 and 862.

The oil passage pipes 861 and 862 are, for example, in the form of a hollow pipe (pipe) and extend in a radial direction. The oil passage pipe 861 is disposed on the X-direction X1 side of the motor housing chamber SP1. The oil passage pipe 861 is connected at one end to the in-case oil passage 84, and is open at the other end with an ejection opening 8610. The ejection opening 8610 of the oil passage pipe 861 axially faces coil turns 3161 (described later) of field windings 316 from axially outside (the X-direction X1 side). The oil passage pipe 862 is disposed on the X-direction X2 side of the motor housing chamber SP1. The oil passage pipe 862 is connected at one end to the in-case oil passage 84, and is open at the other end with an ejection opening 8620. The ejection opening 8620 of the oil passage pipe 862 axially faces coil turns 3162 (described later) of the field windings 316 from axially outside (the X-direction X2 side).

In the example illustrated in FIG. 2, the oil passage pipes 861 and 862 are in the form of a hollow pipe, but may be formed as parts of the in-case oil passage 84. For example, a part or the whole of the oil passage pipe 861 may be formed by an oil passage in a partition wall 2502 described later. Similarly, a part or the whole of the oil passage pipe 862 may be formed by an oil passage in the first cover member 252 described later.

In the present embodiment, the motor case 250 includes the partition wall 2502 that separates the motor housing chamber SP1 and a gear housing chamber SP2 in the axial direction. The partition wall 2502 does not need to strictly separate the motor housing chamber SP1 and the gear housing chamber SP2, and may be formed to separate them in such a manner as to allow oil to pass therebetween as described later.

The partition wall 2502 includes an oil passage 81 for passing oil. The oil passage 81 is provided above the first axis A1 in the partition wall 2502. Specifically, as illustrated in FIG. 2, the oil passage 81 is disposed above the input shaft 31. The oil passage 81 communicates at one end on the lower side with a space 85 surrounded by the case 2 (partition wall 2502), a bearing 241, and a bearing 243, and communicates at the other end on the upper side with an oil passage pipe 82 provided in the gear housing chamber SP2. The oil passage pipe 82 is in the form of a hollow pipe (pipe), and is connected at one end to the oil passage 81 and communicates at the other end with the oil pump 80 of the oil supply device 8 described later. In the example illustrated in FIG. 2, the oil passage pipe 82 extends in an oblique direction oriented downward toward the X2 side, but the oil passage pipe 82 may extend in any direction and may include a bent portion or the like.

The first cover member 252 is coupled to the X-direction X2 side of the motor case 250. The first cover member 252 is in the form of a cover that covers the X-direction X2 side of the motor housing chamber SP1. In this case, the first cover member 252 may cover an opening of the motor case 250 on the X-direction X2 side in such a manner as to completely or substantially completely close the opening. Part of the motor housing chamber SP1 may be formed by the first cover member 252. The first cover member 252 is provided with a bearing 240 that rotatably supports the rotor 310.

The second cover member 253 is provided on the X-direction X2 side of the first cover member 252. The second cover member 253 and the first cover member 252 form a housing chamber SP3 in which the slip rings 318 of the rotary electric machine 1 are housed.

The gear case member 254 cooperates with the partition wall 2502 of the motor case 250 to form the gear housing chamber SP2 in which the power transmission system 7 is housed. The gear case member 254 cooperates with the partition wall 2502 of the motor case 250 to rotatably support the input shaft 31. That is, the input shaft 31 may be rotatably supported by the partition wall 2502 of the motor case 250 via the bearing 243 at the end on the X-direction X2 side, and rotatably supported by the gear case member 254 via another bearing (not illustrated) at the end on the X-direction X1 side.

The rotor 310 includes a rotor core 312, end plates 313, the rotor shaft 314, the field windings 316, end rings 317, and the slip rings 318.

The rotor core 312 may be made up of, for example, laminated annular magnetic steel sheets. As illustrated in FIG. 3, the rotor core 312 has teeth 3122 protruding radially outward. Conductor wires forming the field windings 316 are wound on the rotor core 312. The rotor core 312 has an axial through hole 3120 (see FIG. 2) into which the rotor shaft 314 is fitted. The rotor core 312 is fixed to the outer peripheral surface of the rotor shaft 314 and rotates integrally with the rotor shaft 314.

The end plates 313 are annular plates that cover axial end faces of the rotor core 312. The end plates 313 may be coupled to the rotor shaft 314 by fitting, for example. The end plates 313 are provided on both sides of the rotor core 312 in the axial direction. The end plates 313 may have a shape corresponding to the shape of the end faces of the rotor core 312 when viewed in the axial direction. That is, the end plates 313 may have the shape of an outer peripheral portion corresponding to the teeth 3122 etc. Details of the end plates 313 will be described later.

The rotor shaft 314 defines the first axis A1 that is the rotation axis of the rotary electric machine 1. The rotor shaft 314 is rotatably supported by the first cover member 252 of the case 2 via the bearing 240 on the X-direction X2 side of a portion to which the rotor core 312 is fixed. The rotor shaft 314 is rotatably supported by the partition wall 2502 of the motor case 250 via the bearing 241 on the other axial end side (X-direction X1 side) of the rotary electric machine 1. In this manner, the rotor shaft 314 may be rotatably supported by the case 2 at both axial ends.

As illustrated in FIG. 2 and others, the rotor shaft 314 is coupled to the input shaft 31 on the X-direction X1 side so as to be able to transmit power. Specifically, in the present embodiment, splines (hereinafter, referred to as "female splines 71") are formed on an inner peripheral surface of the rotor shaft 314. The rotor shaft 314 is spline-fitted (clearance-fitted) onto the input shaft 31 with splines (hereinafter, referred to as "male splines 72") formed on an outer peripheral surface of the input shaft 31 meshing with the female splines 71. Hereinafter, the entire part where the rotor shaft 314 and the input shaft 31 are coupled by spline fitting in this manner is referred to as a "spline-fitting part 70".

The rotor shaft 314 is, for example, in the form of a hollow pipe and has a hollow interior 3145. The hollow interior 3145 may extend over the entire length of the rotor shaft 314 in the axial direction, but, in the present embodiment, is closed (solid) on the X-direction X2 side. The rotor shaft 314 may be formed of a plurality of members (pieces).

The hollow interior 3145 of the rotor shaft 314 functions as an axial oil passage 83. That is, as will be described later, oil is supplied to the hollow interior 3145 through the oil passage 81 in the partition wall 2502 and others. Consequently, the rotor shaft 314 is cooled, so that the rotor core 312 can be cooled from radially inside. As a result, the field windings 316 can also be cooled via the rotor core 312.

In the rotor shaft 314, an oil hole 8311 and an oil hole 8312 in the radial direction are formed for discharging the oil to the coil turns 3161 and 3162 of the field windings 316, respectively.

The oil hole 8311 has an opening radially facing the coil turns 3161 of the field windings 316, and supplies the oil in the axial oil passage 83 to the coil turns 3161 of the field windings 316. In the example illustrated in FIG. 2, the oil hole 8311 extends linearly in parallel with the radial direction, but may extend linearly in an oblique direction slightly inclined with respect to the radial direction.

The oil hole 8312 has an opening radially facing the coil turns 3162 of the field windings 316, and supplies the oil in the axial oil passage 83 to the coil turns 3162 of the field windings 316. In the example illustrated in FIG. 2, the oil hole 8312 extends linearly in parallel with the radial direction, but may extend linearly in an oblique direction slightly inclined with respect to the radial direction.

In the example illustrated in FIG. 2, the oil hole 8311 and the oil hole 8312 are formed in the same circumferential position around the rotor shaft 314, but may be formed in different circumferential positions. A plurality of oil holes 8311 and a plurality of oil holes 8312 may be provided in different circumferential positions or axial positions.

As schematically illustrated in FIG. 3, the field windings 316 are wound around the teeth 3122 of the rotor core 312. Field current is supplied to the field windings 316 as described later. As illustrated in FIG. 2, the field windings 316 have the coil turns 3161 and 3162 that are the axial ends protruding axially outward from the axial end faces of the rotor core 312. The coil turns 3161 are located on the X-direction X1 side, and the coil turns 3162 are located on the X-direction X2 side. That is, the coil turns 3161 are located at the axial end of the rotor 310 on the X-direction X1 side, and the coil turns 3162 are located at the axial end of the rotor 310 on the X-direction X2 side.

The end rings 317 have a cylindrical form and are provided on both sides in the axial direction. The end ring 317 on the X-direction X1 side covers the coil turns 3161 of the field windings 316 and the end plate 313 on the X-direction X1 side from radially outside. The end ring 317 on the X-direction X2 side covers the coil turns 3162 of the field windings 316 and the end plate 313 on the X-direction X2 side from radially outside. The end rings 317 may be fixed to the end plates 313 by press fitting or the like. The end rings 317 have axial end faces substantially perpendicular to the axial direction. The axial end faces of the end rings 317 are preferably in a flat form, but may be inclined along the form of axial end faces of the coil turns 3162. Alternatively, the axial end faces of the end rings 317 may have axial recesses and protrusions.

The slip rings 318 are attached to the rotor shaft 314. The slip rings 318 are in the form of a rotary connector and is provided coaxially with the rotor shaft 314. The slip rings 318 are provided at the X2-side end of the rotor shaft 314. The slip rings 318 include conductor rings 3181 and brushes 3182.

The conductor rings 3181 are provided coaxially with the rotor shaft 314 and rotate together with the rotor shaft 314. The conductor rings 3181 are electrically connected to the field windings 316.

The brushes 3182 are electrically connected at one end to the conductor rings 3181 in a slidable manner. The brushes 3182 are electrically connected at the other end to the controller 9 and a high-voltage battery 98 described later.

The stator 320 includes a stator core 321 and stator coils 322.

The stator core 321 may be made up of, for example, laminated annular magnetic steel sheets. On an inner peripheral portion of the stator core 321, teeth 3210 protruding radially inward are radially formed (only one tooth 3210 is illustrated in FIG. 3).

The stator coils 322 may have a form in which an insulating coating is applied to a conductor of a rectangular cross-sectional shape or a circular cross-sectional shape, for example. As illustrated in FIG. 3, the stator coils 322 are wound around the teeth 3210 of the stator core 321. For example, the stator coils 322 may be electrically connected in a Y connection or in a delta connection in one or more parallel relationships.

As illustrated in FIG. 2, the stator coils 322 have coil ends 3221 and 3222 that are portions protruding axially outward from axial end faces of the stator core 321. The coil ends 3221 are located on the X-direction X1 side, and the coil ends 3222 are located on the X-direction X2 side.

The oil supply device 8 includes the oil pump 80 that force-feeds oil (an example of a "liquid coolant") to the rotary electric machine 1 and others. The oil pump 80 is supported by the case 2. The oil pump 80 is disposed as desired, and may be disposed in the motor housing chamber SP1 or the gear housing chamber SP2. The oil pump 80 may be mechanical or electric. The oil supply device 8 may include a combination of a mechanical oil pump and an electric oil pump. The oil supply device 8 may include an oil cooler for lowering the temperature of the oil discharged from the oil pump 80, a strainer, etc.

The controller 9 is electrically connected to the rotary electric machine 1. The controller 9 controls the rotary electric machine 1. For example, the controller 9 may be disposed in the housing chamber SP3, or may be disposed in another housing chamber (not illustrated).

Figure 4:
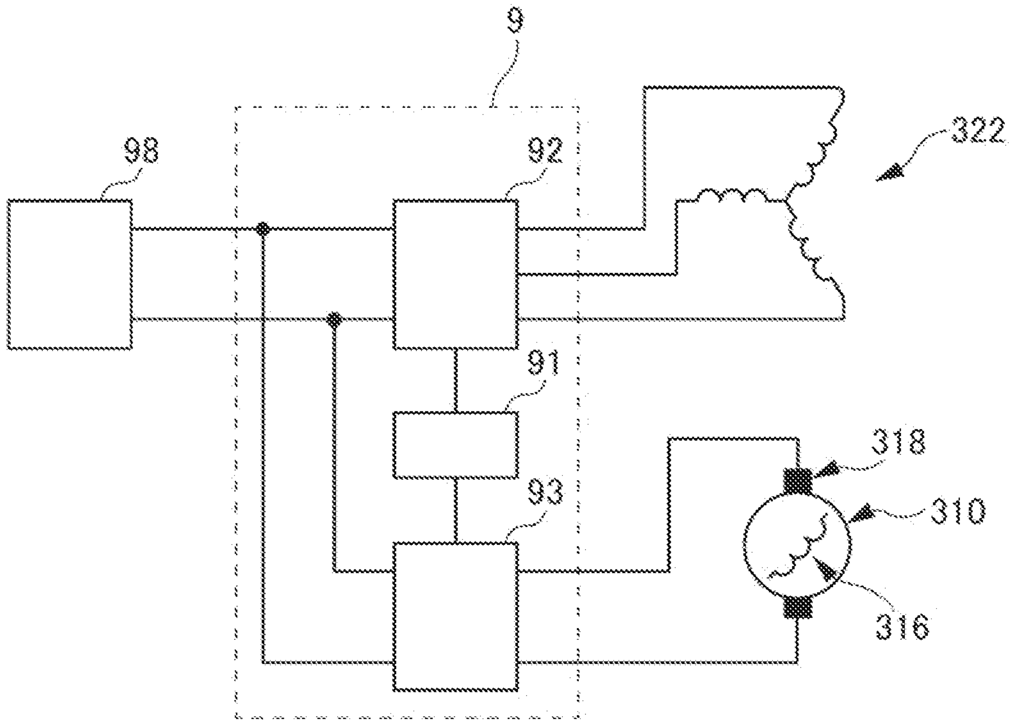
FIG. 4 is a schematic diagram illustrating a control system of the rotary electric machine.

FIG. 4 is a schematic diagram illustrating a control system of the rotary electric machine 1. The controller 9 of the rotary electric machine 1 includes a control unit 91 and power conversion circuits 92 and 93.

The control unit 91 may be in the form of an electronic control unit (ECU). The control unit 91 is electrically connected to various electronic components in the vehicle via a suitable bus such as a controller area network (CAN). The control unit 91 controls the rotary electric machine 1 via the power conversion circuits 92 and 93 in accordance with a command related to a control target value from, for example, an external EUC (not illustrated). Details of a method of controlling the rotary electric machine 1 are arbitrary.

The power conversion circuit 92 is, for example, an inverter, and is provided between the in-vehicle high-voltage battery 98 and the stator coils 322 of the rotary electric machine 1. The power conversion circuit 92 supplies three-phase alternating current to the stator coils 322 based on power from the high-voltage battery 98.

The power conversion circuit 93 is, for example, a DC-DC converter, and is provided between the in-vehicle high-voltage battery 98 and the field windings 316 of the rotary electric machine 1. The power conversion circuit 93 supplies field current to the field windings 316 based on power from the high-voltage battery 98.

Here, with reference to FIGS. 5A to 6, in the flow of oil in an oil passage structure of the present embodiment, a mode of supply of oil to the coil turns 3162 of the field windings 316, and a preferable configuration of the end plates 313 will be described.

The following describes the flow of oil when the rotary electric machine 1 is driven. However, the flow other than the flow caused by centrifugal force described below can be provided even when the rotary electric machine 1 is not driven. The following mainly describes the flow of oil on the X-direction X1 side. The flow of oil on the X-direction X2 side may be substantially the same.

Figure 5A:
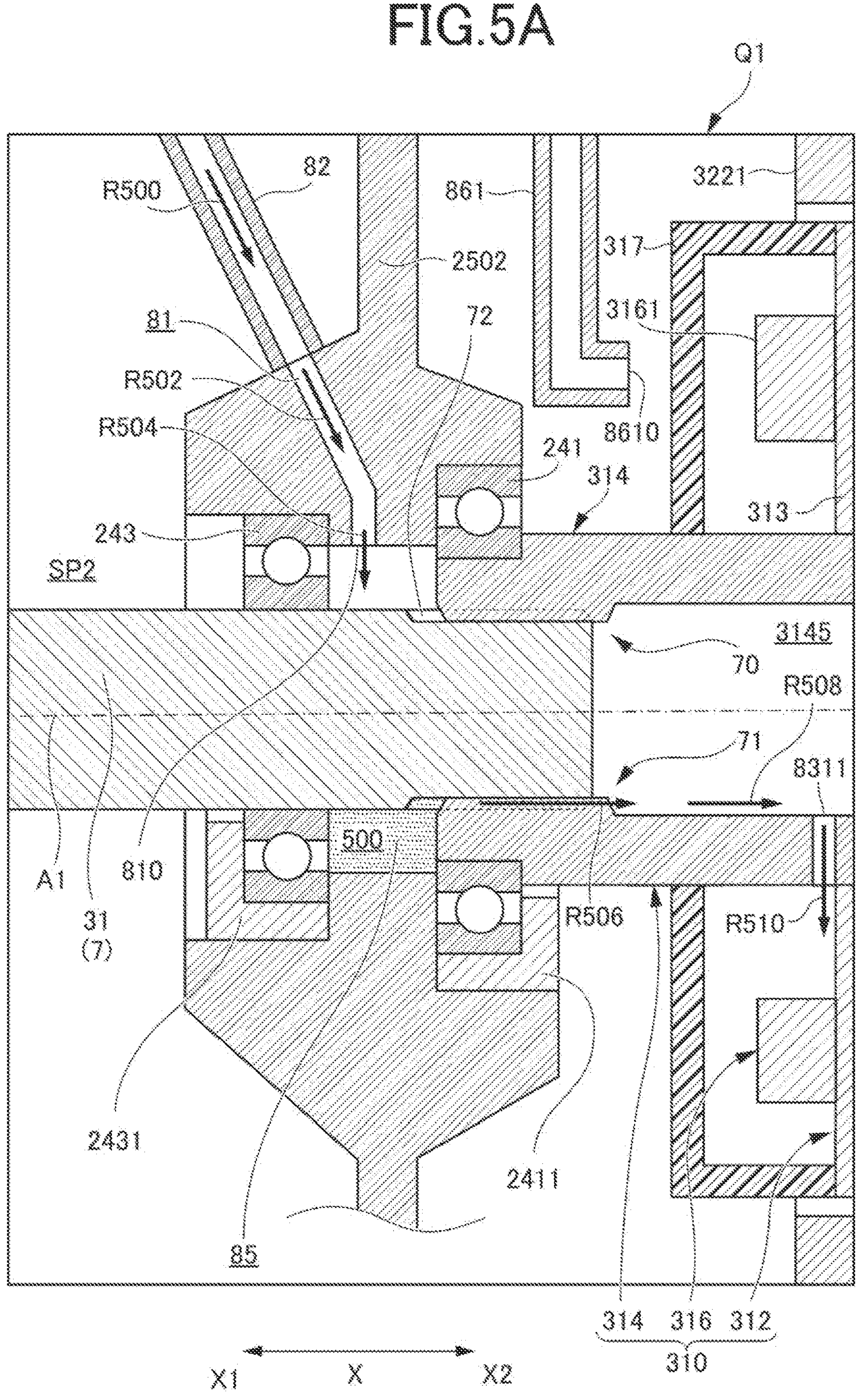
FIG. 5A is an enlarged view of part Q1 in FIG. 2.
Figure 5B:
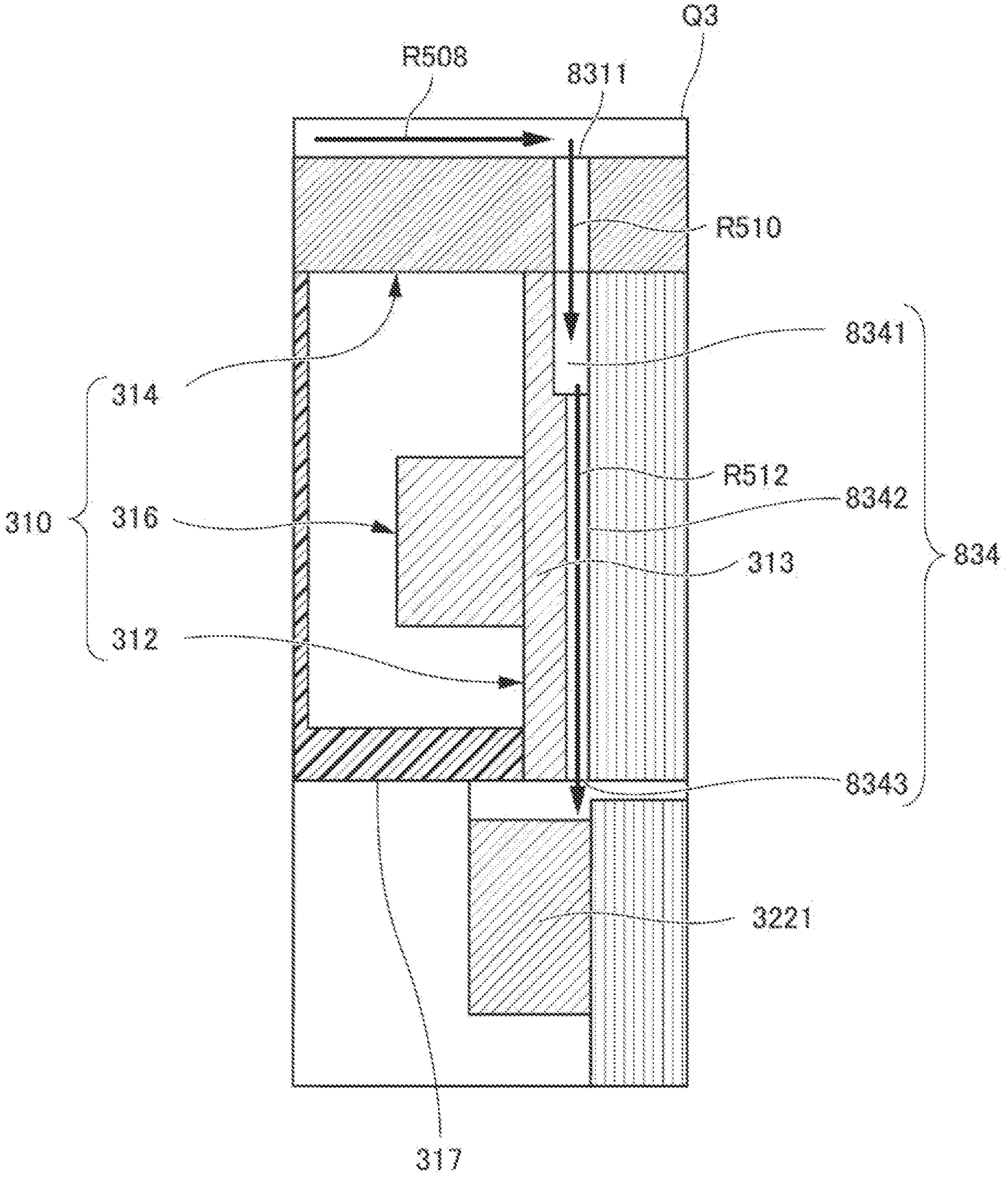
FIG. 5B is an enlarged view of part Q3 in FIG. 2.
Figure 5C:
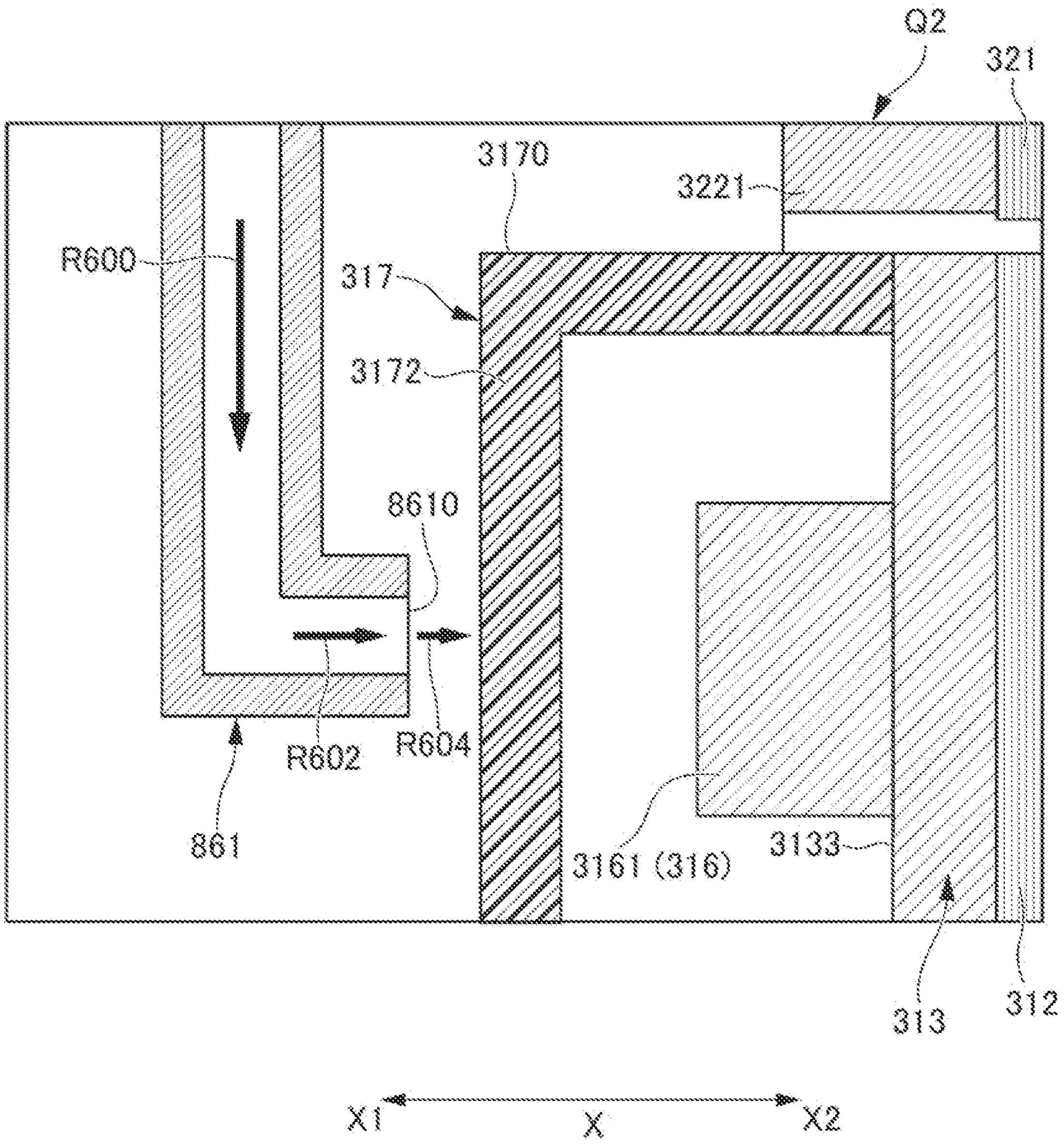
FIG. 5C is an enlarged view of part Q2 in FIG. 2.

FIG. 5A is an enlarged view of part Q1 in FIG. 2. In FIG. 5A, the flow of oil is schematically illustrated by arrows R500 to R510. FIG. 5B is an enlarged view of part Q3 in FIG. 2. In FIG. 5B, the flow of oil is schematically illustrated by arrows R500 to R512. FIG. 5C is an enlarged view of part Q2 in FIG. 2. In FIG. 5C, the flow of oil is schematically illustrated by arrows R600 to R604. FIG. 6 is a perspective view illustrating an example of each end plate 313.

As illustrated in FIG. 5A, oil discharged from the oil pump 80 passes through the oil passage pipe 82 and reaches the oil passage 81 in the partition wall 2502 (see arrow R500). The oil that has reached the oil passage 81 flows downward through the oil passage 81 (see arrow R502), and is dripped from an opening 810 at the lower end into the space 85 and to the spline-fitting part 70 or the vicinity thereof (see arrow R504). The oil flowing downward through the oil passage 81 is dripped from the opening 810 at the lower end under the influence of gravity, but may be ejected from the opening 810 at the lower end under the influence of hydraulic pressure from the oil pump 80.

The oil supplied into the space 85 through the oil passage 81 in this manner accumulates in the lower side of the space 85 under the influence of gravity. This accumulation of the oil in the space 85 can be promoted by weir members 2411 and 2431 provided at the bearings 241 and 243, respectively. The weir member 2411 has a function to hold back the oil that can leak from the space 85 through the bearing 241 into the motor housing chamber SP1.

When the accumulation of the oil in the space 85 becomes relatively large, and the top of the accumulation of the oil (the height of the accumulation of the oil) rises above gaps in the spline-fitting part 70 (in FIG. 5A, the oil in the space 85 is illustrated by a hatched area 500), part of the accumulation of the oil passes through the gaps in the spline-fitting part 70 and reaches the hollow interior 3145 of the rotor shaft 314 (see arrow R506).

Here, when the rotary electric machine 1 is driven, the rotor shaft 314 is rotating, and the oil reaching the hollow interior 3145 of the rotor shaft 314 flows along the inner peripheral surface of the rotor shaft 314 by the action of centrifugal force (see arrow R508). When reaching an inlet (radially inner opening) of the oil hole 8311, the oil flowing along the inner peripheral surface of the rotor shaft 314 is ejected radially outward from an outlet (radially outer opening) of the oil hole 8311 toward the coil turns 3161 of the field windings 316 by the action of centrifugal force (see arrow R510). Similarly, when reaching an inlet (radially inner opening) of the oil hole 8312, the flow along the inner peripheral surface of the rotor shaft 314 is ejected radially outward from an outlet (radially outer opening) of the oil hole 8312 toward the coil turns 3162 of the field windings 316 by the action of centrifugal force (not illustrated).

When the oil in the hollow interior 3145 of the rotor shaft 314 is thus ejected radially outward by centrifugal force, a negative pressure in the hollow interior 3145 of the rotor shaft 314 increases. Consequently, due to this negative pressure, the flow of the oil through the gaps in the spline-fitting part 70 into the hollow interior 3145 of the rotor shaft 314 (see arrow R506) described above is accelerated. In this way, according to the present embodiment, by utilizing the negative pressure in the hollow interior 3145 of the rotor shaft 314, the flow of the oil through the gaps in the spline-fitting part 70 into the hollow interior 3145 of the rotor shaft 314 (see arrow R506) can be effectively accelerated. As a result, even when the oil is supplied to the hollow interior 3145 of the rotor shaft 314 through the gaps in the spline-fitting part 70, an appropriate amount of oil supply can be provided.

As illustrated in FIG. 5C, oil discharged from the oil pump 80 reaches the oil passage pipe 861 through the in-case oil passage 84 (see FIG. 2) (see arrow R600). The oil that has reached the oil passage pipe 861 is ejected from the ejection opening 8610 of the oil passage pipe 861 to the axial end face of the end ring 317 (see arrows R602 and R604). Similarly, although not illustrated, the oil reaching the oil passage pipe 862 on the X2 side is ejected from the ejection opening 8620 of the oil passage pipe 862 to the end ring 317. This can dissipate heat from the coil turns 3161 and 3162 through the end rings 317. To enhance this heat dissipation, the end rings 317 are formed of a material having high thermal conductivity such as aluminum. A space between the end ring 317 and the coil turns 3161 may be filled with a resin material.

As described above, according to the present embodiment, the coil turns 3161 and 3162 of the field windings 316 are cooled by the oil supplied from the hollow interior 3145 of the rotor shaft 314. Furthermore, the coil turns 3161 and 3162 of the field windings 316 are cooled via the oil ejected from the oil passage pipes 861 and 862 to the end rings 317. Consequently, the coil turns 3161 and 3162 of the field windings 316 can be effectively cooled.

The ejection opening 8610 of the oil passage pipe 861 (the same applies to the ejection opening 8620 of the oil passage pipe 862) may face the vicinity of the radial center (the vicinity of the center of the radially extending range) of the coil turns 3161 of the field windings 316, or may face the coil turns 3161 radially inside the radial center, with the end ring 317 therebetween.

As illustrated in FIG. 2, in a configuration in which the coil turns 3161 and 3162 of the field windings 316 overlap the coil ends 3221 and 3222 of the stator coils 322 in the axial direction (that is, a configuration in which they overlap when viewed in the radial direction) as in the present embodiment, the amount of oil supply to the coil ends 3221 and 3222 tends to decrease. For example, in a configuration in which the oil from the hollow interior 3145 of the rotor shaft 314 is directly ejected to the coil turns 3161 and 3162 of the field windings 316 as in the present embodiment, the oil cannot be directly ejected to the coil ends 3221 and 3222. Thus, this configuration facilitates effective cooling of the coil turns 3161 and 3162 of the field windings 316, but, on the other hand, tends to reduce the performance of cooling the coil ends 3221 and 3222 by the oil from the hollow interior 3145 of the rotor shaft 314.

In this regard, the present embodiment can ensure the performance of cooling the coil ends 3221 and 3222 using the oil from the hollow interior 3145 of the rotor shaft 314 as will be described in detail below.

That is, in the present embodiment, as illustrated in FIG. 5B, the oil ejected radially outward through the oil hole 8311 (see arrow R510 in FIGS. 5A and 5B) passes through oil passages 834 between the end plate 313 and the rotor core 312, and is supplied (ejected) to the coil ends 3221. This can ensure a necessary amount of oil supply to the coil ends 3221 and 3222 even in the configuration in which the coil turns 3161 and 3162 of the field windings 316 overlap the coil ends 3221 and 3222 of the stator coils 322 in the axial direction.

Figure 6:
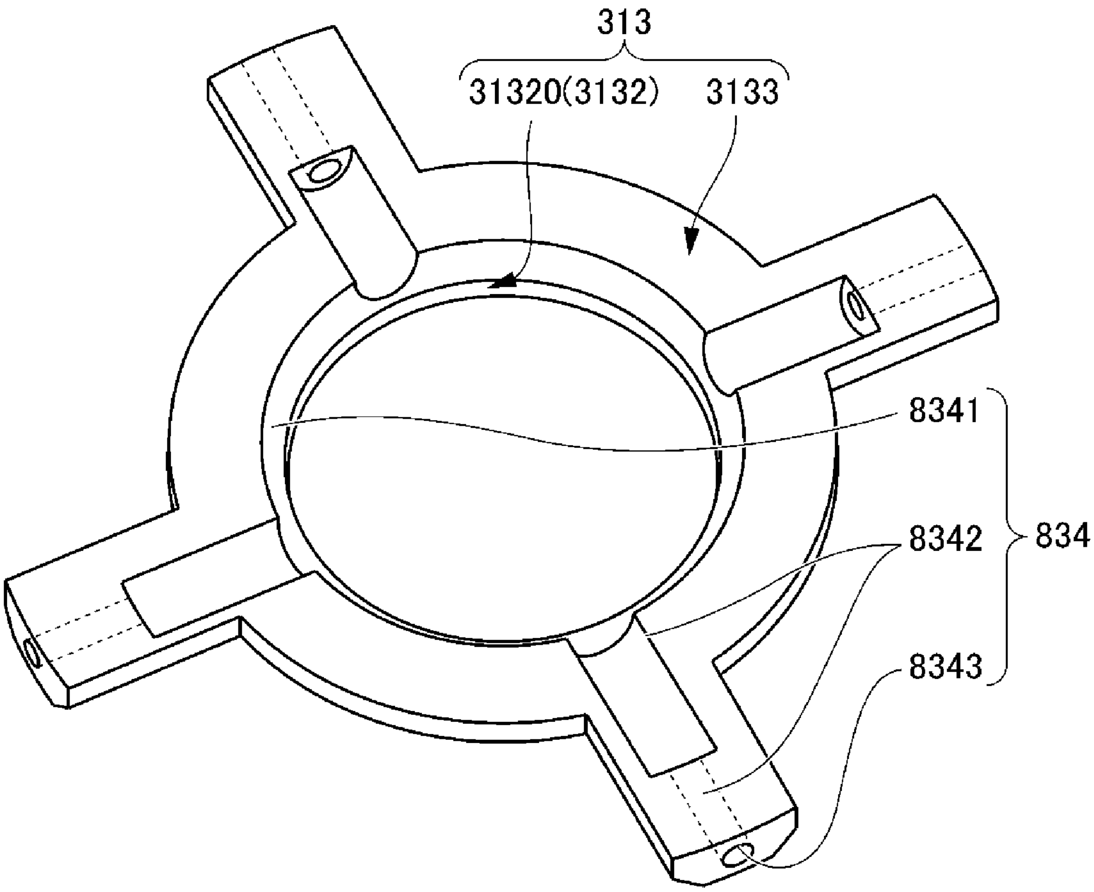
FIG. 6 is a perspective view illustrating an example of an end plate.

Specifically, in the present embodiment, as illustrated in FIG. 6, each end plate 313 includes a fitting portion 3132 and a base portion 3133. The end plates 313 are preferably formed of a material having high thermal conductivity (for example, aluminum), but may be formed of another material such as resin.

The fitting portion 3132 has a fitting hole 31320 to be fitted onto the rotor shaft 314.

The base portion 3133 extends in a plane perpendicular to the axial direction to cover the axial end face of the rotor core 312. The base portion 3133 extends radially outward from an outer peripheral portion of the fitting portion 3132.

The end plate 313 axially abuts, at part of the axially inner surface, the axial end face of the rotor core 312, and forms the oil passages 834 between the remaining part of the surface and the rotor core 312. Thus, the oil passages 834 can be formed using the end plate 313. The field windings 316 are disposed in contact with the axially outer surface of the end plate 313.

The oil passages 834 extend radially outward from the rotor shaft 314, passing axially inside the coil turns 3161. The oil passages 834 have discharge openings 8343 at radially outer ends. The discharge openings 8343 radially face the stator 320. In the present embodiment, the discharge openings 8343 radially face the coil ends 3221 of the stator coils 322.

Specifically, the oil passages 834 include, as oil passage portions, a first flow passage 8341 extending annularly and a plurality of second flow passages 8342.

The first flow passage 8341 is formed radially inside the base portion 3133. The first flow passage 8341 radially faces the rotor shaft 314 and is continuous with the oil hole 8311 in the rotor shaft 314. By providing the first flow passage 8341 extending annularly, the oil can be distributed to the plurality of second flow passages 8342 described later.

The second flow passages 8342 extend radially outward from the first flow passage 8341. The second flow passages 8342 may be formed in individual radial parts of the base portion 3133. The radially outer ends of the second flow passages 8342 communicate with the discharge openings 8343.

As schematically illustrated in FIG. 5B, the oil passages 834 like this allow the oil in the rotor shaft 314 to be introduced into the first flow passage 8341 of the oil passages 834 through the oil hole 8311 under the influence of centrifugal force (see arrow R510). Then, the oil introduced into the first flow passage 8341 further flows radially outward through the second flow passages 8342 and is ejected from the discharge openings 8343 to the coil ends 3221 under the influence of centrifugal force (see arrow R512). Consequently, the coil ends 3221 are effectively cooled.

In particular, according to the present embodiment, the oil in the rotor shaft 314 is ejected to the coil ends 3221 through the oil passages 834 without being directly ejected to the field windings 316. Consequently, as compared with a case where oil that has passed through the field windings 316 is supplied to the coil ends 3221, oil having a high cooling capacity (that is, oil having a low temperature) can be supplied to the coil ends 3221, and the capacity for cooling the coil ends 3221 can be enhanced.

Further, according to the present embodiment, since the oil passages 834 are provided axially inside the end plate 313, even when the coil ends 3221 are located axially inside the coil turns 3161, the oil can be easily guided to the coil ends 3221 through the oil passages 834.

In the present embodiment, the circumferential position of the oil hole 8311 may coincide with the circumferential position of at least one of the plurality of second flow passages 8342. In this case, the oil ejected radially outward from the oil hole 8311 is relatively easily supplied to the second flow passage 8342 radially facing the oil hole 8311. Consequently, the oil can be efficiently supplied to the coil ends 3221.

Meanwhile, when the circumferential positions of one or more oil holes 8311 coincide with the circumferential positions of some of the second flow passages 8342, the oil is supplied less to the other second flow passages 8342 that do not coincide in circumferential position with the oil holes 8311. Therefore, to equalize the amounts of oil flowing through the second flow passages 8342, all the oil holes 8311 may be circumferentially offset from the plurality of second flow passages 8342. That is, the circumferential positions of the oil holes 8311 and the second flow passages 8342 may be set such that none of the second flow passages 8342 coincide with the oil holes 8311 in circumferential position.

Next, a configuration related to oil passage switching will be described with reference to FIG. 7.

Figure 7:
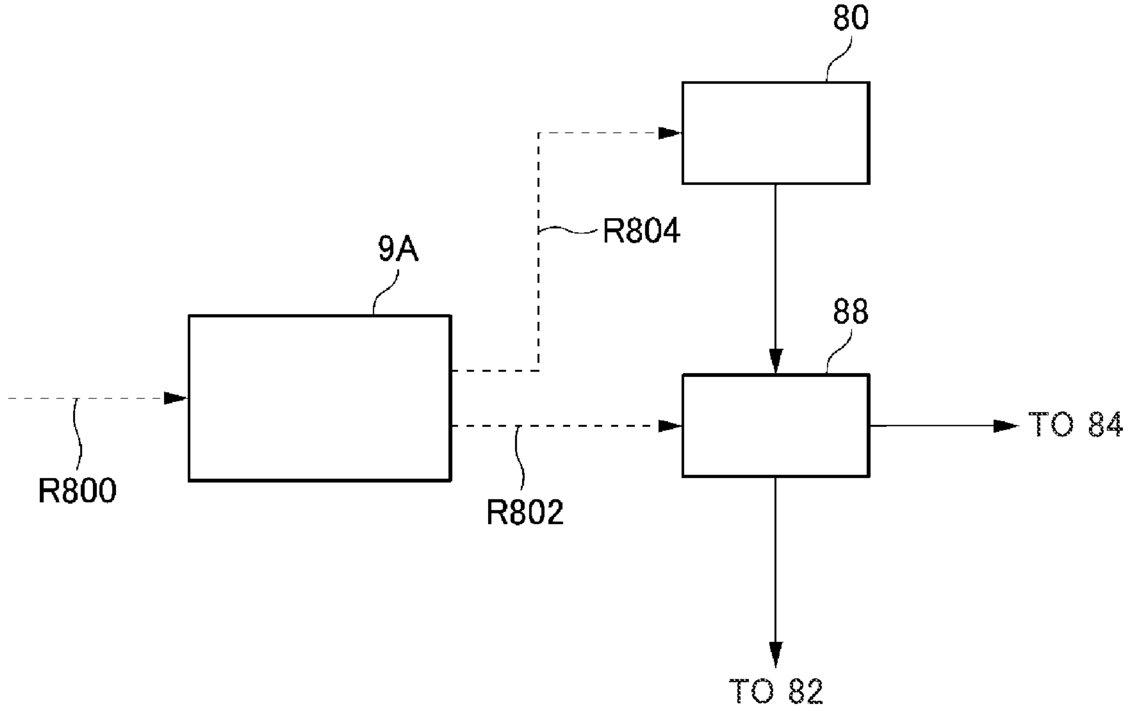
FIG. 7 is an explanatory diagram of a configuration related to oil passage switching.

FIG. 7 is an explanatory diagram of the configuration related to oil passage switching. In an example illustrated in FIG. 7, a valve 88 is provided which switches the flow passage of the oil discharged from the oil pump 80 to the oil passage pipe 82 or to the in-case oil passage 84. The valve 88 may be, for example, an electronically controllable electromagnetic valve. The valve 88 may be provided, for example, at point P1 illustrated in FIG. 2. The valve 88 is controlled by a controller 9A. The controller 9A may be implemented by the same control unit as that of the controller 9 described above.

Information for calculation or acquisition of the value of a switching parameter may be input to the controller 9A (see R800). When a preset switching condition is satisfied based on the value of the switching parameter, the controller 9A transmits a command to the valve 88 (see R802) to switch the state of the valve 88 between a first state in which the oil from the oil pump 80 is supplied to the oil passage pipe 82 and a second state in which the oil from the oil pump 80 is supplied to the in-case oil passage 84.

In the first state, the oil from the oil pump 80 is supplied through the oil passage pipe 82 into the rotor shaft 314 and then supplied to the coil turns 3161 and 3162 of the field windings 316 and, after that, to the coil ends 3221 and 3222 of the stator coils 322 as described above.

In the second state, the oil from the oil pump 80 is supplied through the in-case oil passage 84 and the oil passage pipes 861 and 862 to cool the coil turns 3161 and 3162 of the field windings 316 and the coil ends 3221 and 3222 of the stator coils 322 as described above.

The switching parameter is arbitrary, but may be, for example, the rotational speed of the rotary electric machine 1. In this case, when the rotational speed of the rotary electric machine 1 is lower than or equal to a relatively low first threshold Th1, a condition for switching to the second state may be satisfied. The first threshold Th1 is arbitrary, but may correspond to the lower limit of a speed range in which flows of air around the coil turns 3161 and 3162 described above do not significantly inhibit the ejection of the oil from the oil passage pipes 861 and 862. When the rotational speed of the rotary electric machine 1 is higher than or equal to a relatively high second threshold Th2, a condition for switching to the first state may be satisfied. The second threshold Th2 is arbitrary, but may be a rotational speed at which the above-described negative pressure is relatively high.

In the example illustrated in FIG. 7, the valve 88 is used to selectively switch between the first state and the second state, but the present disclosure is not limited to this configuration. For example, instead of the valve 88, a valve that can change the distribution ratio such as a flow control valve may be provided. In this case, the distribution ratio may be controlled such that as the rotational speed of the rotary electric machine 1 increases, the amount (ratio) of oil supplied to the oil passage pipe 82 (and then into the rotor shaft 314) of the oil discharged from the oil pump 80 increases (see R802).

In the example illustrated in FIG. 7, the oil pump 80 may be electric. In this case, in the second state, the controller 9A may control the oil pump 80 so that the discharge amount of the oil pump 80 increases as the rotational speed of the rotary electric machine 1 increases (see R804).

Alternatively, the oil pump 80 may be controlled according to the magnitude of field current applied to the field windings 316, power, etc. In this case, for example, the oil pump 80 may be controlled such that the discharge amount of the oil pump 80 increases as the magnitude of field current applied to the field windings 316 increases. Alternatively, when a temperature sensor (for example, a thermistor) is provided at the field windings 316, the oil pump 80 may be controlled such that the discharge amount of the oil pump 80 increases as the temperature of the field windings 316 increases.

Next, another embodiment (a second embodiment) will be described with reference to FIGS. 8 to 13.

A vehicle drive unit 100A according to the present embodiment is different from the vehicle drive unit 100 according to the above-described embodiment (first embodiment) mainly in the oil passage structure. The following mainly describes components related to the oil passage structure. In the following embodiment, the same components as those in the first embodiment described above are denoted by the same reference numerals, and description thereof is omitted.

Figure 8:
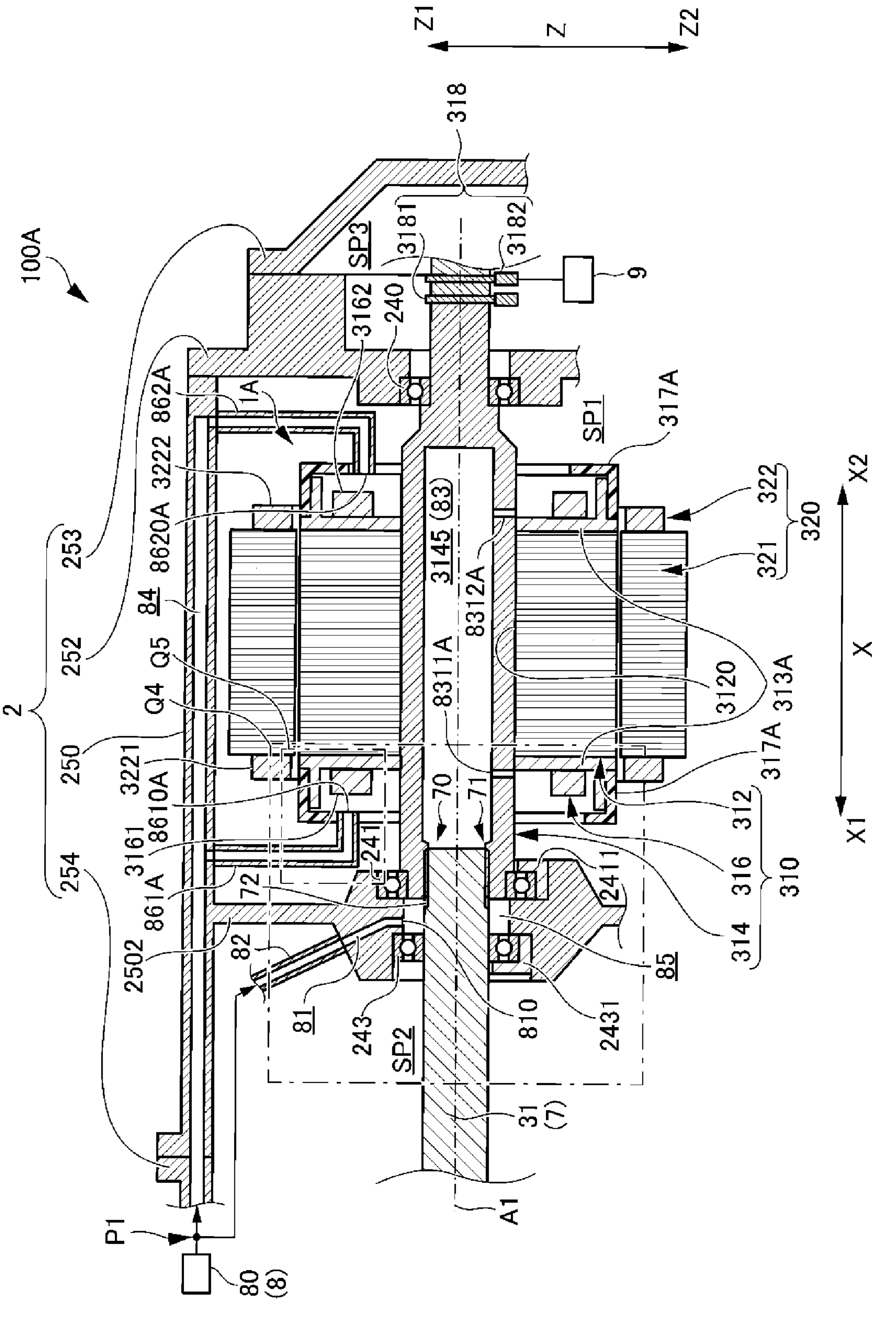
FIG. 8 is a schematic cross-sectional view illustrating a general outline of a rotary electric machine according to a second embodiment.

FIG. 8 is a schematic cross-sectional view illustrating a general outline of a rotary electric machine 1A according to the second embodiment.

The rotor 310 includes the rotor core 312, end plates 313A, the rotor shaft 314, the field windings 316, end rings 317A, and the slip rings 318.

The field windings 316 may be the same as those of the above-described first embodiment. However, in the present embodiment, varnish or the like may be applied to parts to be hit by the oil and others to be described later.

The end plates 313A are annular plates that cover the axial end faces of the rotor core 312. The end plates 313A may be coupled to the rotor shaft 314 by fitting, for example. The end plates 313A are provided on both sides of the rotor core 312 in the axial direction. The end plates 313A may have a shape corresponding to the shape of the end faces of the rotor core 312 when viewed in the axial direction. That is, the end plates 313A may have the shape of an outer peripheral portion corresponding to the teeth 3122 etc. Details of the end plates 313A will be described later.

The end rings 317A have a cylindrical form and are provided on both sides in the axial direction. The end ring 317A on the X-direction X1 side covers the coil turns 3161 of the field windings 316 and the end plate 313A on the X-direction X1 side from radially outside. The end ring 317A on the X-direction X2 side covers the coil turns 3162 of the field windings 316 and the end plate 313A on the X-direction X2 side from radially outside. The end rings 317A may be fixed to the end plates 313A by press fitting or the like. Details of the end rings 317A will be described later.

Here, with reference to FIGS. 9 to 13, in the flow of oil in the oil passage structure of the present embodiment, a mode of supply of oil to the coil turns 3162 of the field windings 316, and preferable configurations of the end plates 313A and the end rings 317A will be described.

The following describes the flow of oil when the rotary electric machine 1 is driven. However, the flow other than the flow caused by centrifugal force described below can be provided even when the rotary electric machine 1 is not driven. The following mainly describes the flow of oil on the X-direction X1 side. The flow of oil on the X-direction X2 side may be substantially the same.

Figure 9:
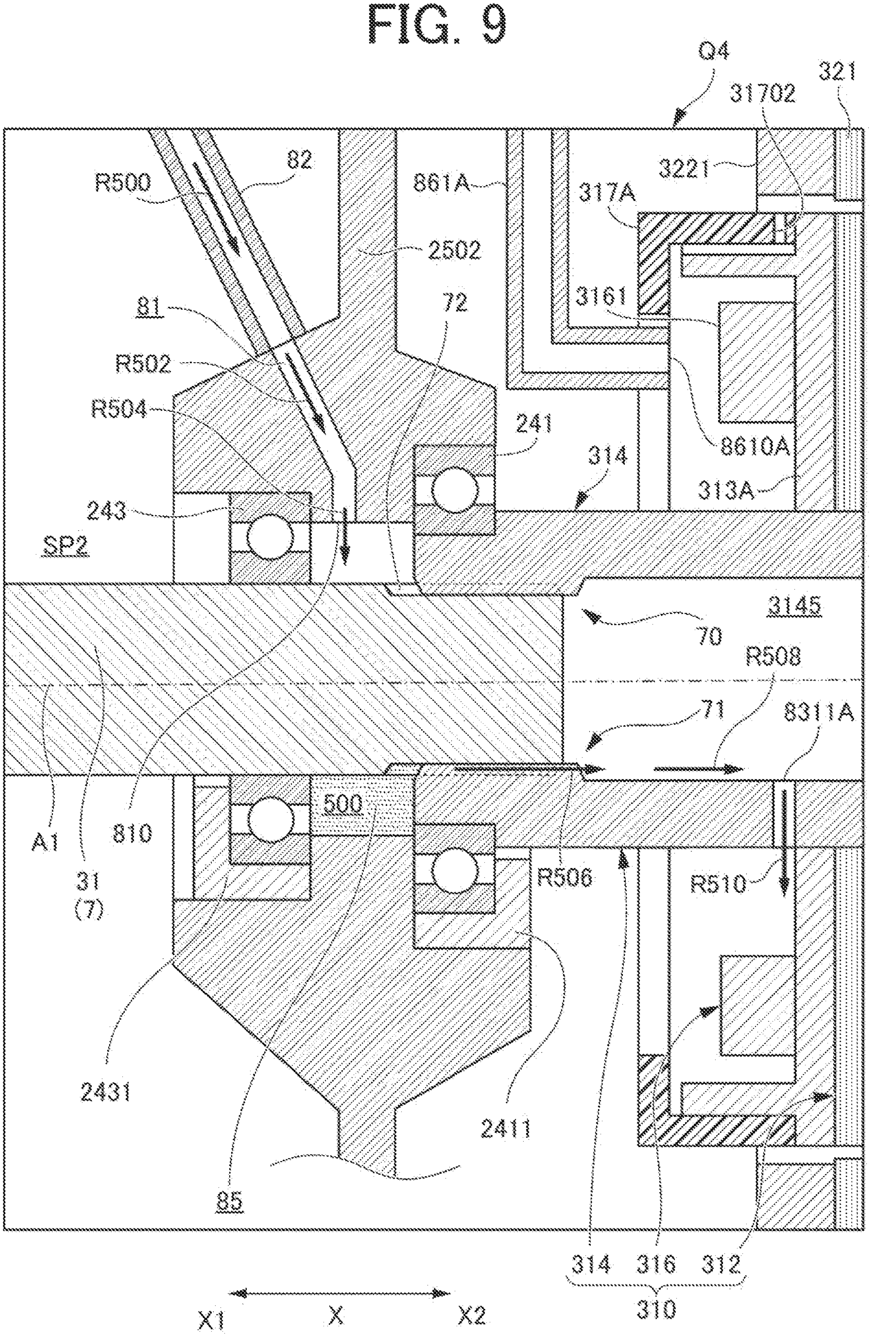
FIG. 9 is an enlarged view of part Q4 in FIG. 8.
Figure 10:
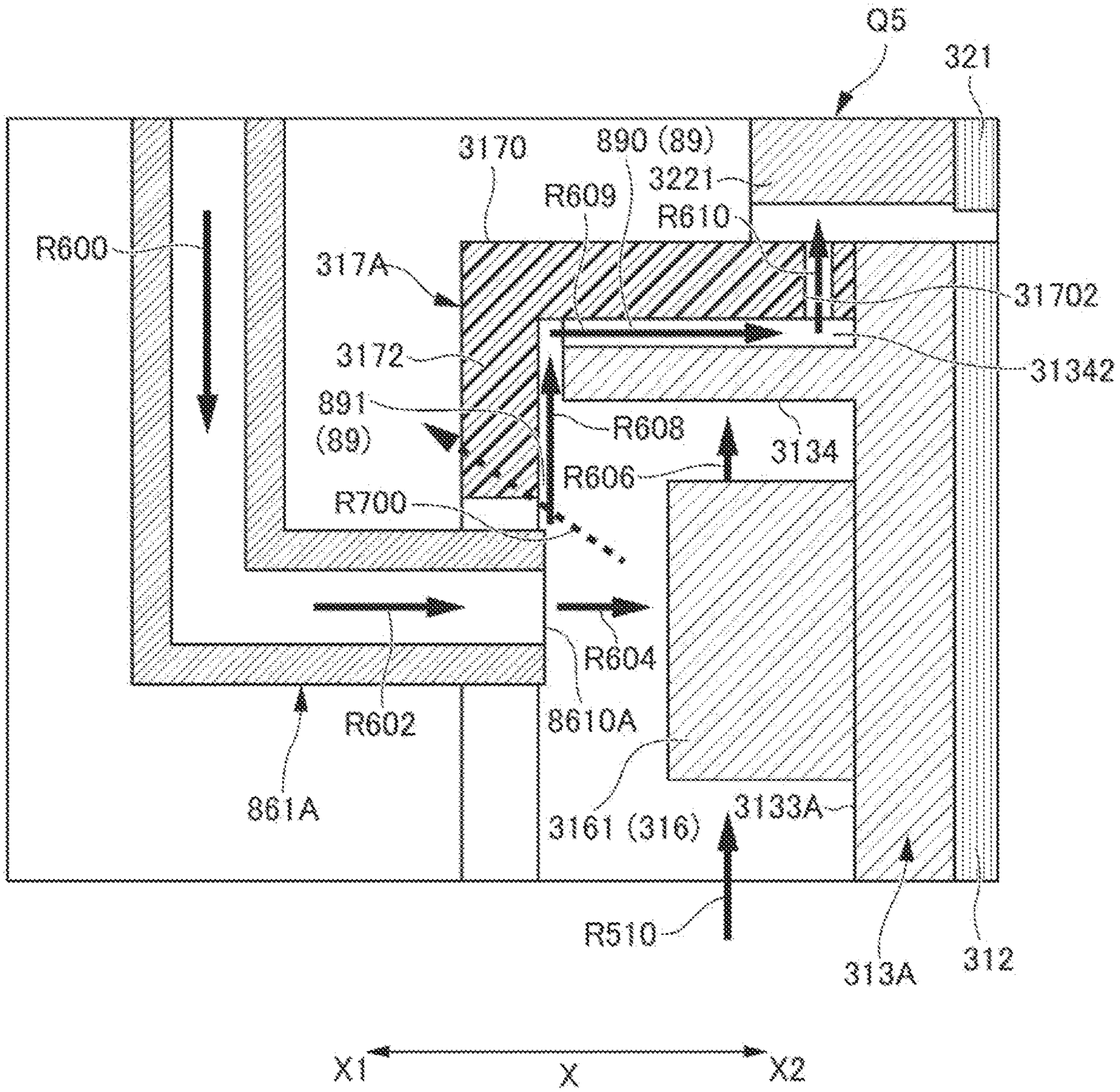
FIG. 10 is an enlarged view of part Q5 in FIG. 8.
Figure 12:
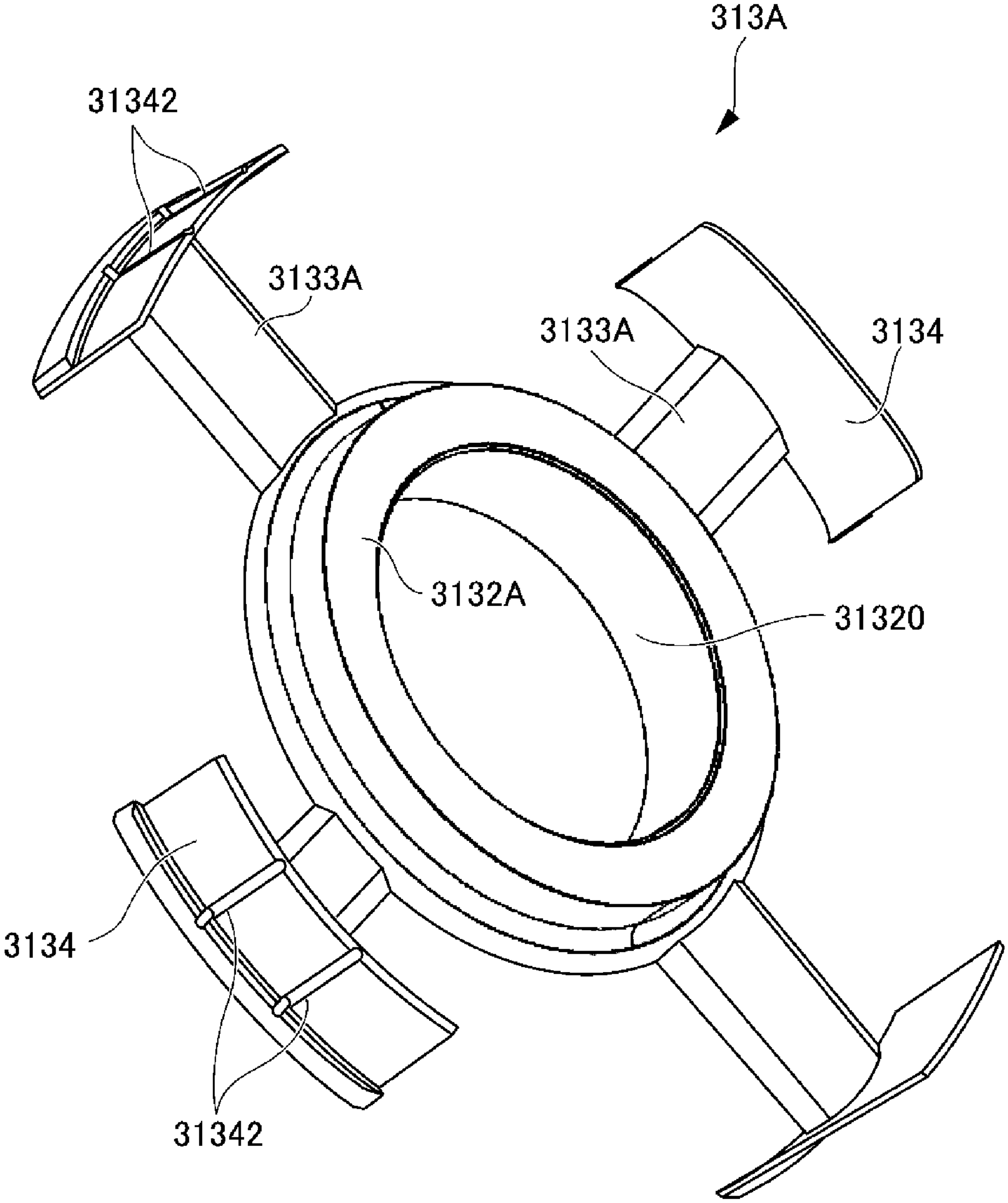
FIG. 12 is a perspective view illustrating an example of an end plate.
Figure 13:
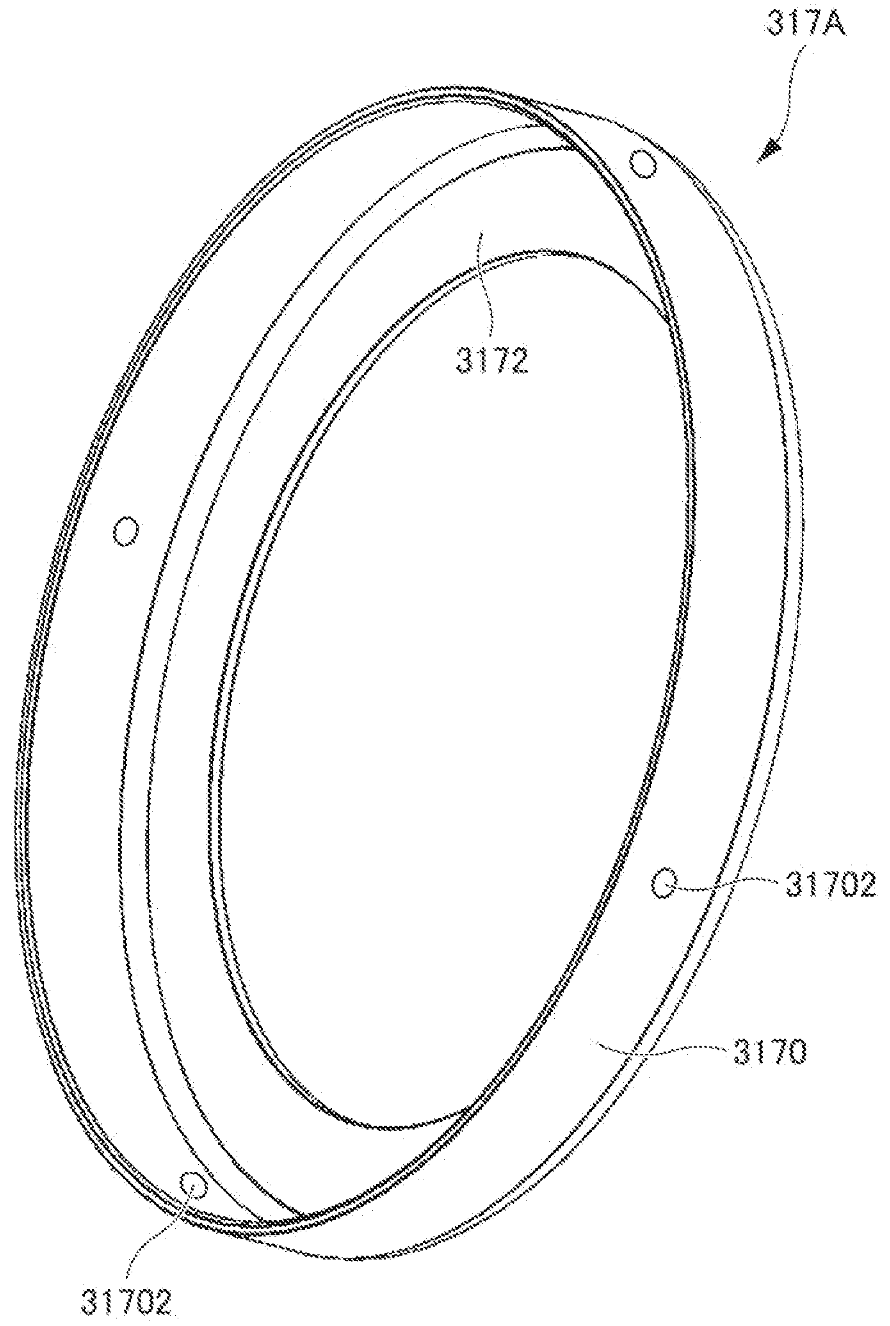
FIG. 13 is a perspective view illustrating an example of an end ring.

FIG. 9 is an enlarged view of part Q4 in FIG. 8. In FIG. 9, the flow of oil is schematically illustrated by arrows R500 to R510. FIG. 10 is an enlarged view of part Q5 in FIG. 8. In FIG. 10, the flow of oil is schematically illustrated by arrows R600 to R610. FIG. 12 is a perspective view illustrating an example of each end plate 313A. FIG. 13 is a perspective view illustrating an example of each end ring 317A.

As illustrated in FIG. 9, oil discharged from the oil pump 80 passes through the oil passage pipe 82 and reaches the oil passage 81 in the partition wall 2502 (see arrow R500). The oil that has reached the oil passage 81 flows downward through the oil passage 81 (see arrow R502), and is dripped from the opening 810 at the lower end into the space 85 and to the spline-fitting part 70 or the vicinity thereof (see arrow R504). The oil flowing downward through the oil passage 81 is dripped from the opening 810 at the lower end under the influence of gravity, but may be ejected from the opening 810 at the lower end under the influence of hydraulic pressure from the oil pump 80.

The oil supplied into the space 85 through the oil passage 81 in this manner accumulates in the lower side of the space 85 under the influence of gravity. This accumulation of the oil in the space 85 can be promoted by the weir members 2411 and 2431 provided at the bearings 241 and 243, respectively. The weir member 2411 has a function to hold back the oil that can leak from the space 85 through the bearing 241 into the motor housing chamber SP1.

When the accumulation of the oil in the space 85 becomes relatively large, and the top of the accumulation of the oil (the height of the accumulation of the oil) rises above the gaps in the spline-fitting part 70 (in FIG. 9, the oil in the space 85 is illustrated by the hatched area 500), part of the accumulation of the oil passes through the gaps in the spline-fitting part 70 and reaches the hollow interior 3145 of the rotor shaft 314 (see arrow R506).

Here, when the rotary electric machine 1 is driven, the rotor shaft 314 is rotating, and the oil reaching the hollow interior 3145 of the rotor shaft 314 flows along the inner peripheral surface of the rotor shaft 314 by the action of centrifugal force (see arrow R508). When reaching an inlet (radially inner opening) of an oil hole 8311A, the oil flowing along the inner peripheral surface of the rotor shaft 314 is ejected radially outward from an outlet (radially outer opening) of the oil hole 8311A toward the coil turns 3161 of the field windings 316 by the action of centrifugal force (see arrow R510). Similarly, when reaching an inlet (radially inner opening) of an oil hole 8312A, the flow along the inner peripheral surface of the rotor shaft 314 is ejected radially outward from an outlet (radially outer opening) of the oil hole 8312A toward the coil turns 3162 of the field windings 316 by the action of centrifugal force (not illustrated).

When the oil in the hollow interior 3145 of the rotor shaft 314 is thus ejected radially outward by centrifugal force, a negative pressure in the hollow interior 3145 of the rotor shaft 314 increases. Consequently, due to this negative pressure, the flow of the oil through the gaps in the spline-fitting part 70 into the hollow interior 3145 of the rotor shaft 314 (see arrow R506) described above is accelerated. In this way, according to the present embodiment, by utilizing the negative pressure in the hollow interior 3145 of the rotor shaft 314, the flow of the oil through the gaps in the spline-fitting part 70 into the hollow interior 3145 of the rotor shaft 314 (see arrow R506) can be effectively accelerated. As a result, even when the oil is supplied to the hollow interior 3145 of the rotor shaft 314 through the gaps in the spline-fitting part 70, an appropriate amount of oil supply can be provided.

As illustrated in FIG. 10, oil discharged from the oil pump 80 reaches an oil passage pipe 861A (see arrow R600) through the in-case oil passage 84. The oil that has reached the oil passage pipe 861A is ejected from an ejection opening 8610A of the oil passage pipe 861A to the coil turns 3161 of the field windings 316 (see arrow R604). Similarly, although not illustrated, the oil reaching an oil passage pipe 862A is ejected from an ejection opening 8620A of the oil passage pipe 862A to the coil turns 3162 of the field windings 316.

As described above, according to the present embodiment, to the coil turns 3161 and 3162 of the field windings 316, the oil from the hollow interior 3145 of the rotor shaft 314 is ejected from radially inside, and the oil from the oil passage pipes 861A and 862A is ejected from axially outside. Consequently, the coil turns 3161 and 3162 of the field windings 316 can be effectively cooled.

The ejection opening 8610A of the oil passage pipe 861A (the same applies to the ejection opening 8620A of the oil passage pipe 862A) may face the vicinity of the radial center of the coil turns 3161 of the field windings 316, or may face the coil turns 3161 radially inside the radial center. In this case, it can be expected that the oil will spread radially over the entire coil turns 3161 of the field windings 316 by the action of centrifugal force. Alternatively, the ejection opening 8610A of the oil passage pipe 861A (the same applies to the ejection opening 8620A of the oil passage pipe 862A) may face the coil turns 3161 of the field windings 316 radially outside and vertically above the radial center of the coil turns 3161. In this case, it can be expected that the oil will spread radially over the entire coil turns 3161 of the field windings 316 due to the influence of gravity.

In the present embodiment, as in the above-described embodiment, the oil is also supplied to the coil turns 3161 and 3162 of the field windings 316 from radially inside from the hollow interior 3145 of the rotor shaft 314. Consequently, even at the time of high-speed rotation of the rotor 310, the coil turns 3161 and 3162 can be effectively cooled by the oil from the hollow interior 3145 of the rotor shaft 314.

Furthermore, according to the present embodiment, at the time of low-speed rotation of the rotor 310 during which the amount of oil supply to the hollow interior 3145 of the rotor shaft 314 tends to decrease due to a decrease in the negative pressure described above, a relatively large amount of oil can be thrown onto the coil turns 3161 and 3162 of the field windings 316 through the oil passage pipes 861A and 862A.

Thus, the present embodiment also facilitates the stabilization of the amount of oil supply to the coil turns 3161 and 3162 over a possible range of rotational speeds of the rotor 310. In this regard, as will be described later with reference to FIG. 7, the oil passage may be switched according to the rotational speed of the rotor 310.

Figure 11:
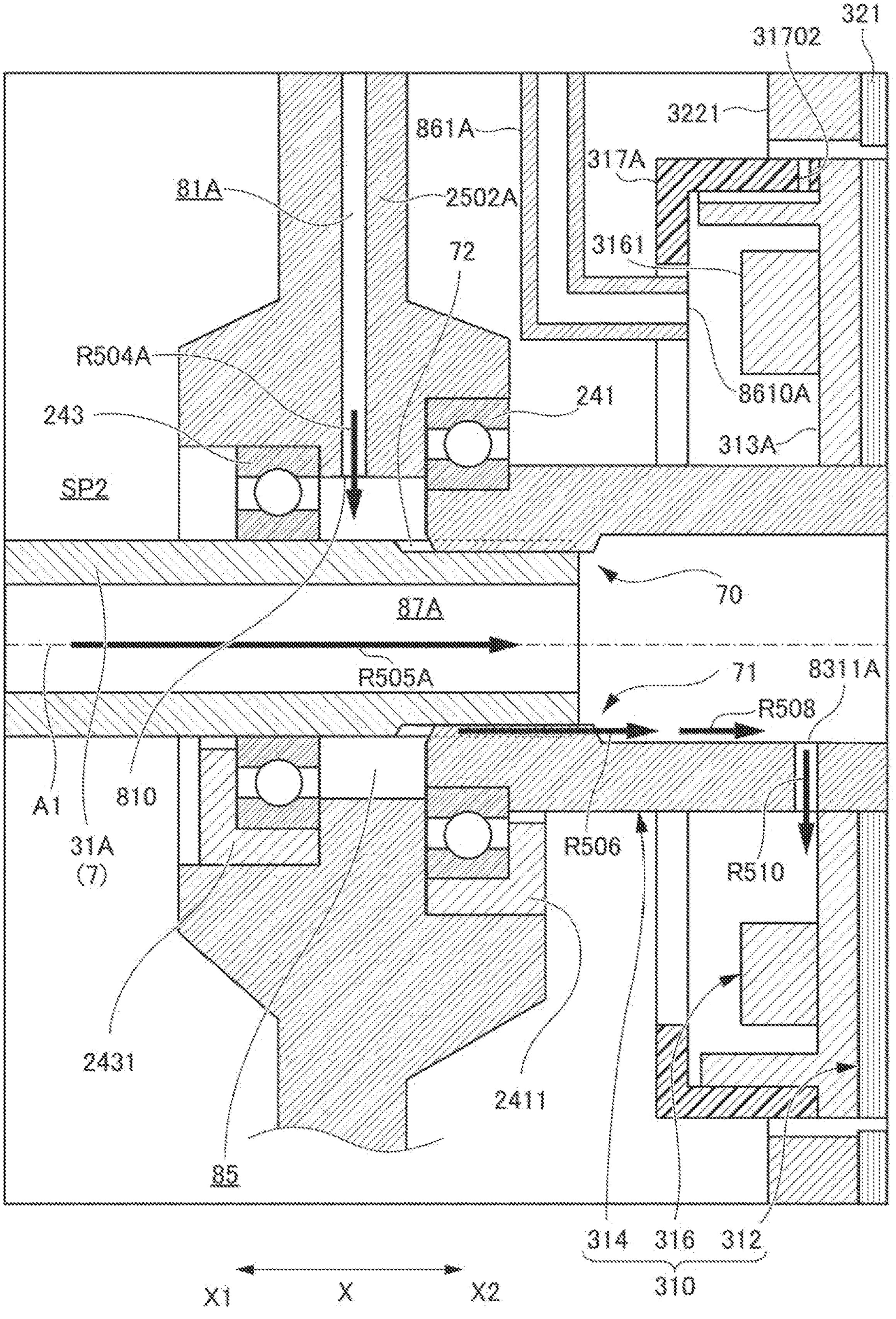
FIG. 11 is an explanatory diagram of a modification of a configuration of a tubular passage for supplying oil to the hollow interior of a rotor shaft.

In the present embodiment, as illustrated in FIGS. 8 and 9, the oil is supplied to the hollow interior 3145 of the rotor shaft 314 through a tubular passage formed by a combination of the oil passage 81 and the oil passage pipe 82 and through gaps between the space 85 and the female splines 71. However, the configuration of the tubular passage for supplying the oil to the hollow interior 3145 of the rotor shaft 314 can be varied and is not limited thereto. For example, as illustrated in FIG. 11, the oil passage 81 and the oil passage pipe 82 may be replaced with a tubular passage 81A formed in a partition wall 2502A. In this case, the radially outer end of the tubular passage 81A may be connected to the in-case oil passage 84 (see FIG. 8). Through this tubular passage 81A, the oil can be supplied into the rotor shaft 314 through the above-described space 85 and others in a similar manner (see arrow R504A). Alternatively, as illustrated in FIG. 11, the oil passage 81 and the oil passage pipe 82 may be replaced with the tubular passage 87A in a hollow input shaft 31A. In this case, the tubular passage 87A may directly communicate at the end on the X-direction X2 side with the hollow interior 3145 of the rotor shaft 314, and communicate at the end on the X-direction X1 side with the oil pump 80. Through this tubular passage 87A, the oil can also be supplied into the rotor shaft 314 (see arrow R505A). In this case, the hollow input shaft 31A is a component of the rotary electric machine 1 as an example of a second coolant pipe. In another modification, the oil may be supplied into the rotor shaft 314 from the X-direction X2 side through a tubular passage (not illustrated). These modifications can also be applied to the first embodiment described above.

As illustrated in FIG. 8, in the configuration in which the coil turns 3161 and 3162 of the field windings 316 overlap the coil ends 3221 and 3222 of the stator coils 322 in the axial direction (that is, the configuration in which they overlap when viewed in the radial direction) as in the present embodiment, the amount of oil supply to the coil ends 3221 and 3222 tends to decrease. For example, in the configuration in which the oil from the hollow interior 3145 of the rotor shaft 314 is directly ejected to the coil turns 3161 and 3162 of the field windings 316 as in the present embodiment, the oil cannot be directly ejected to the coil ends 3221 and 3222. Thus, this configuration allows effective cooling of the coil turns 3161 and 3162 of the field windings 316, but, on the other hand, tends to reduce the performance of cooling the coil ends 3221 and 3222 by the oil from the hollow interior 3145 of the rotor shaft 314.

In this regard, the present embodiment can ensure the performance of cooling the coil ends 3221 and 3222 while adopting the configuration in which the oil from the hollow interior 3145 of the rotor shaft 314 is directly ejected to the coil turns 3161 and 3162 of the field windings 316, as will be described in detail below.

That is, in the present embodiment, as illustrated in FIGS. 9 and 10, the oil ejected to the coil turns 3161 through the oil hole 8311A (see arrow R510 in FIGS. 9 and 10) and the oil ejected to the coil turns 3161 through the oil passage pipe 861A (see arrow R604 in FIG. 10) are supplied to the coil ends 3221 through oil passages 89 formed by gaps between the coil turns 3161 or the end plate 313A and the end ring 317A. This can ensure a necessary amount of oil supply to the coil ends 3221 and 3222 even in the configuration in which the coil turns 3161 and 3162 of the field windings 316 overlap the coil ends 3221 and 3222 of the stator coils 322 in the axial direction.

Specifically, in the present embodiment, as illustrated in FIG. 12, each end plate 313A includes a fitting portion 3132A, base portions 3133A, and walls 3134.

The fitting portion 3132A has a fitting hole 31320 to be fitted onto the rotor shaft 314.

The base portions 3133A extend in a plane perpendicular to the axial direction to cover the axial end face of the rotor core 312. The base portions 3133A extend radially outward from outer peripheral portions of the fitting portion 3132A.

The walls 3134 are provided at the radially outer ends of the base portions 3133A. The walls 3134 are erected in the axial direction to face the coil turns 3161 in the radial direction from radially outside. Grooves 31342 are provided on the radially outer sides of the walls 3134. The grooves 31342 may extend in the axial direction as illustrated in FIG. 12. In an example illustrated in FIG. 12, two grooves 31342 are formed on each wall 3134, but the number of the grooves 31342 is arbitrary.

In the present embodiment, as illustrated in FIGS. 10 and 13, each end ring 317A includes a peripheral wall 3170 and an annular wall 3172.

The peripheral wall 3170 extends in the circumferential direction and the axial direction radially outside the coil turns 3161. The peripheral wall 3170 faces the walls 3134 of the end plate 313A in the radial direction from radially outside. The peripheral wall 3170 may be fixed to the walls 3134 by press fitting. The peripheral wall 3170 is disposed radially inside the coil ends 3221, facing the coil ends 3221 in the radial direction. The peripheral wall 3170 has holes 31702 in the radial direction. The holes 31702 radially face the coil ends 3221. That is, the peripheral wall 3170 has the holes 31702 at positions to radially face the coil ends 3221. From the holes 31702, the oil in oil passages 890 to be described later is ejected toward the coil ends 3221 (see arrow R610 in FIG. 10).

As illustrated in FIG. 13, a plurality of holes 31702 (in this example, as an example, four corresponding to the four walls 3134) may be formed along the circumferential direction to radially face the walls 3134 of the end plate 313A, and/or a plurality of holes 31702 may be formed along the axial direction. Instead of the holes 31702, axial gaps between the peripheral wall 3170 and outer peripheral edges of the end plate 313A may function like the holes 31702.

The peripheral wall 3170 is positioned with respect to the walls 3134 of the end plate 313A to form radial gaps with the walls 3134. In this case, the oil passages 890 formed radially by the gaps between the peripheral wall 3170 and the walls 3134 can be formed as part of the oil passages 89. The oil passages 890 communicate at one end with oil passages 891 to be described later, and communicate at the other end with the holes 31702 in the end ring 317A.

In the present embodiment, the oil passages 890 radially formed by the gaps between the peripheral wall 3170 and the walls 3134 are formed by the axial grooves 31342 on the walls 3134. This facilitates the axial flow of the oil in the oil passages 890, and can reduce the leakage of the oil in the oil passages 890 in the circumferential direction (leakage from the circumferential edges of the walls 3134). In a modification, instead of the grooves 31342 on the walls 3134, the oil passages 890 may be formed by grooves (extending axially) formed on the peripheral wall 3170 side in the same manner. In the present embodiment, the oil passages 890 are formed to extend linearly in the axial direction at circumferential parts of the walls 3134, but may be formed to extend linearly in the axial direction at the circumferential entireties of the walls 3134.

The annular wall 3172 extends radially inward from an axial end of the peripheral wall 3170. The annular wall 3172 faces the base portions 3133A in the axial direction from axially outside. This can guide, for example, the oil that can move from the coil turns 3161 axially outward and radially outward (see arrow R700 in FIG. 10) to the oil passages 89, to efficiently supply the oil to the coil ends 3221.

As illustrated in FIG. 10, the annular wall 3172 is preferably disposed axially outside or at the same axial position as the ejection opening 8610A of the oil passage pipe 861A. In other words, the ejection opening 8610A of the oil passage pipe 861A is located radially inside the annular wall 3172, and is disposed to be coincide with the annular wall 3172 when viewed in the radial direction, or disposed to be axially closer to the coil turns 3161 than the annular wall 3172. This can effectively reduce the possibility that the oil ejected from the ejection opening 8610A of the oil passage pipe 861A scatters axially outward of the annular wall 3172 due to the flow of air around the coil turns 3161, bounces, etc. However, in a modification, the ejection opening 8610A of the oil passage pipe 861A may be located radially inside the annular wall 3172 and disposed at a position axially farther from the coil turns 3161 than the annular wall 3172.

The annular wall 3172 preferably axially faces the coil turns 3161 from axially outside. That is, the annular wall 3172 overlaps the coil turns 3161 when viewed in the axial direction while axially spaced apart from the coil turns 3161. In this case, the oil passages 891 formed by gaps between the annular wall 3172 and the coil turns 3161 can be formed as part of the oil passages 89, and the oil can be efficiently supplied to the coil ends 3221 (see arrow R608 in FIG. 10).

Thus, according to the present embodiment, as described above, the oil ejected from radially inside and axially outside individually toward the coil turns 3161 hits the coil turns 3161 (see arrows R510 and R604 in FIG. 10), cooling the coil turns 3161 while moving radially outward by centrifugal force etc. (see arrow R606 in FIG. 10). The oil moving radially outward can be guided to the coil ends 3221 through the oil passages 89, and the coil ends 3221 can be efficiently cooled.

In particular, according to the present embodiment, since the oil passages 89 include the oil passages 890 radially formed by the gaps between the peripheral wall 3170 and the walls 3134, and the oil passages 891 formed by the gaps between the annular wall 3172 and the coil turns 3161 as described above, the oil ejected toward the coil turns 3161 can be efficiently collected and guided to the coil ends 3221 (see arrows R606 to R610 in FIG. 10). That is, it is possible to maximize the ratio of the oil that can be guided to the coil ends 3221 of the oil ejected from radially inside and axially outside individually toward the coil turns 3161. This can effectively achieve not only the cooling of the coil turns 3161 but also the cooling of the coil ends 3221.

Further, according to the present embodiment, even when the coil ends 3221 are located axially inside the coil turns 3161, the oil can be guided axially inward through the oil passages 890 (see arrow R609 in FIG. 10), and the cooling of the coil ends 3221 by the oil ejected toward the coil turns 3161 can be achieved. When the coil ends 3221 are not located axially inside the coil turns 3161 (for example, when located at substantially the same axial position), the oil passages 890 may be omitted.

The second embodiment described above can be achieved in combination with the first embodiment described above as appropriate. For example, in the first embodiment described above, the end rings 317A according to the second embodiment may be replaced with the end rings 317 according to the first embodiment described above.

Next, another embodiment (a third embodiment) will be described with reference to FIGS. 14 to 18. A vehicle drive unit 100B according to the present embodiment is mainly different from the vehicle drive unit 100 according to the above-described embodiment (first embodiment) mainly in the oil passage structure. The following mainly describes components related to the oil passage structure. In the following embodiment, the same components as those in the first embodiment described above are denoted by the same reference numerals, and description thereof is omitted.

Figure 14:
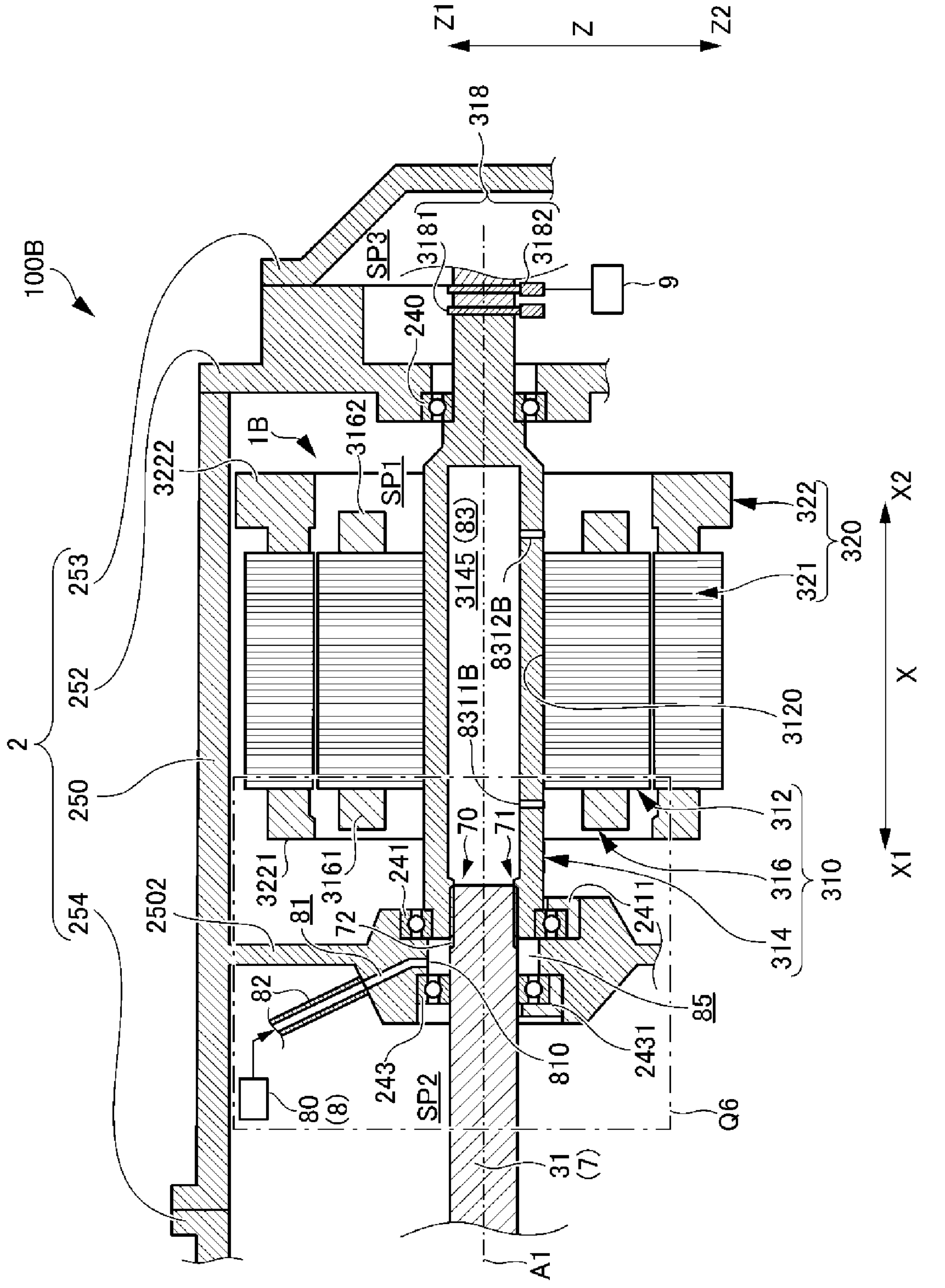
FIG. 14 is a schematic cross-sectional view illustrating a general outline of a rotary electric machine according to a third embodiment.

FIG. 14 is a schematic cross-sectional view illustrating a general outline of a rotary electric machine 1B according to the third embodiment.

The rotary electric machine 1B according to the present embodiment is different from the rotary electric machine 1 according to the first embodiment described above in the oil passage structure. With reference to FIGS. 15 to 18, the following describes the flow of oil in the oil passage structure of the present embodiment, mainly a mode of oil supply through the spline-fitting part 70. The following describes the flow of oil when the rotary electric machine 1B is driven. However, the flow other than the flow caused by centrifugal force described below can be provided even when the rotary electric machine 1B is not driven.

Figure 15:
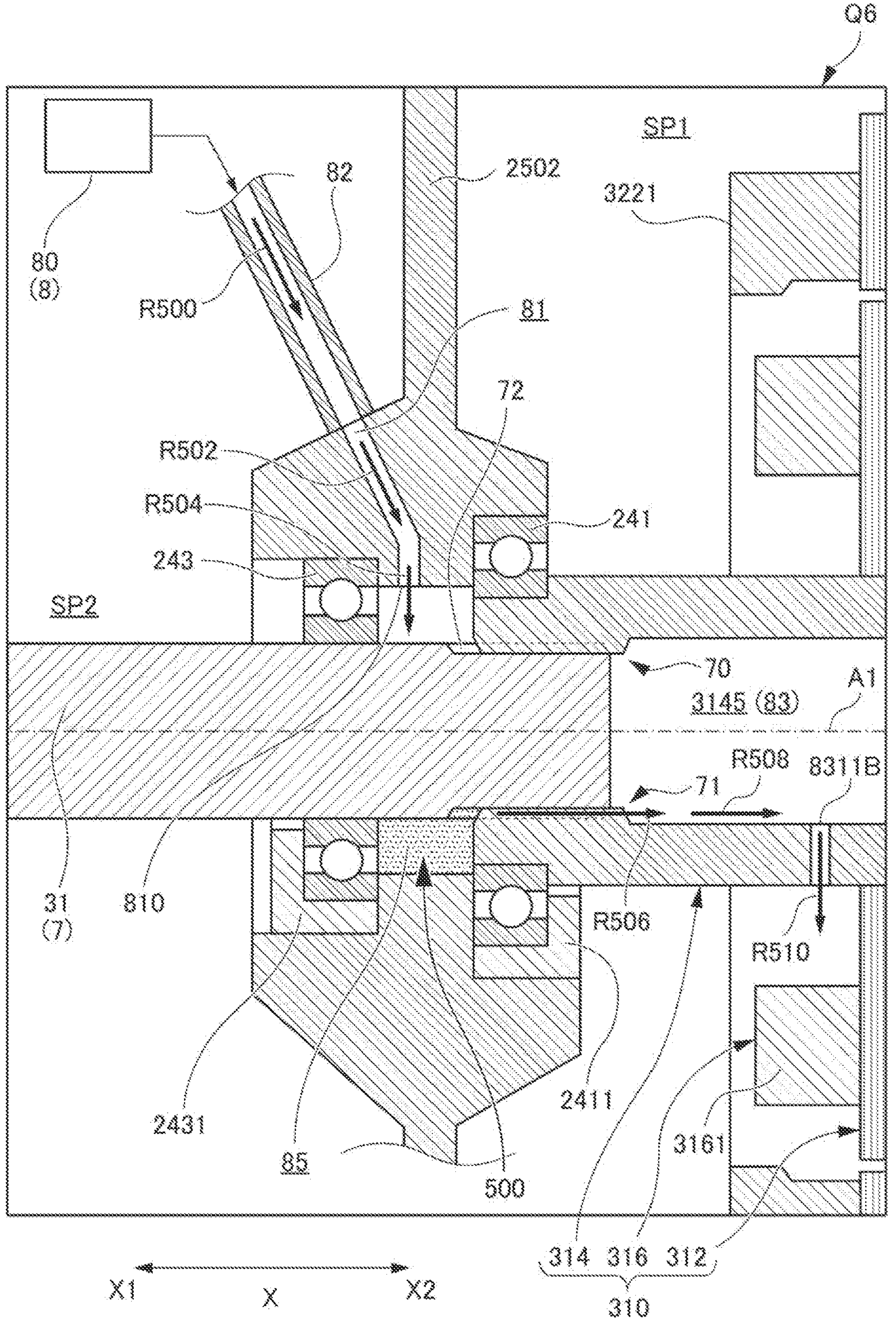
FIG. 15 is an enlarged view of part Q6 in FIG. 14.
Figure 16:
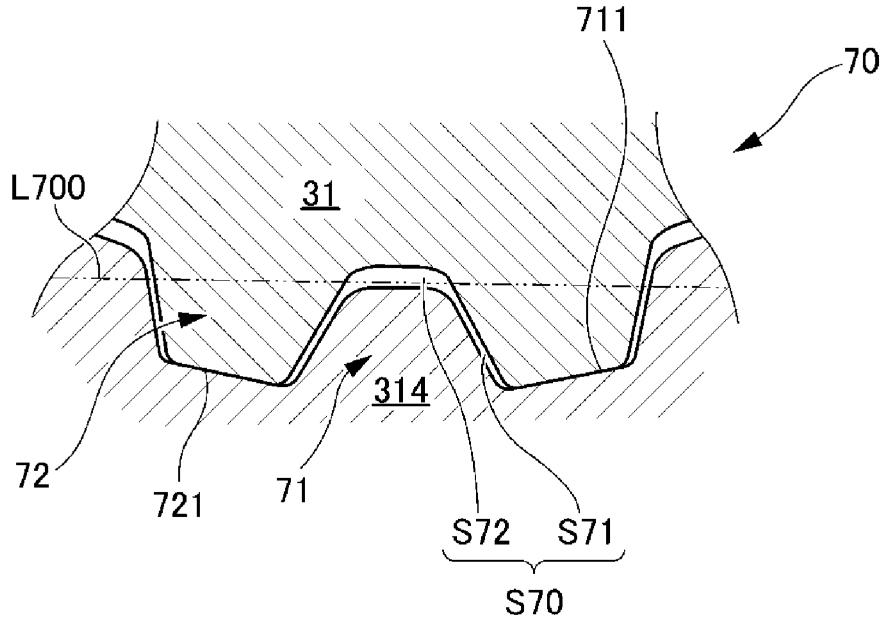
FIG. 16 is a cross-sectional view illustrating part of a spline-fitting part.
Figure 17:
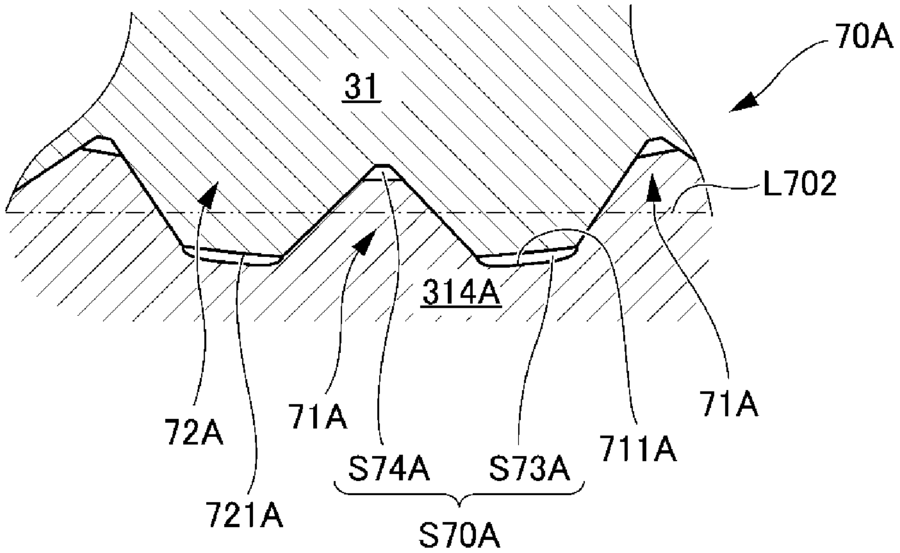
FIG. 17 is a cross-sectional view illustrating part of a spline-fitting part according to a modification.

FIG. 15 is an enlarged view of part Q6 in FIG. 14. In FIG. 15, the flow of oil is schematically illustrated by arrows R500 to R510. FIG. 16 is a cross-sectional view illustrating part of the spline-fitting part 70. FIG. 17 is a cross-sectional view illustrating part of a spline-fitting part 70A according to a modification.

Oil discharged from the oil pump 80 passes through the oil passage pipe 82 and reaches the oil passage 81 in the partition wall 2502 (see arrow R500). The oil reaching the oil passage 81 flows downward through the oil passage 81 (see arrow R502), and is dripped from the opening 810 at the lower end into the space 85 and to the spline-fitting part 70 or the vicinity thereof (see arrow R504). The vicinity of the spline-fitting part 70 is a concept including an area that is on the X1 side of the spline-fitting part 70 and on the X2 side of the bearing 243. The oil flowing downward through the oil passage 81 is dripped from the opening 810 at the lower end under the influence of gravity, but may be ejected from the opening 810 at the lower end under the influence of hydraulic pressure from the oil pump 80.

The oil supplied into the space 85 through the oil passage 81 in this manner accumulates in the lower side of the space 85 under the influence of gravity. This accumulation of the oil in the space 85 can be promoted by the weir members 2411 and 2431 provided at the bearings 241 and 243, respectively. The weir member 2411 has a function to hold back the oil that can leak from the space 85 through the bearing 241 into the motor housing chamber SP1. As schematically illustrated in FIG. 14, the weir member 2411 is provided to cover a gap between the inner race and the outer race of the bearing 241. The weir member 2411 does not need to be provided over the entire circumference of the bearing 241, and may be provided to a lower partial circumferential section. The weir member 2431 has a function to hold back the oil that can leak from the space 85 through the bearing 243 into the gear housing chamber SP2. As schematically illustrated in FIG. 14, the weir member 2431 is provided to cover a gap between the inner race and the outer race of the bearing 243. The weir member 2431 does not need to be provided over the entire circumference of the bearing 243, and may be provided to a lower partial circumferential section.

When the accumulation of the oil in the space 85 becomes relatively large, and the top of the accumulation of the oil (the height of the accumulation of the oil) rises above gaps S70 (see FIG. 16) in the spline-fitting part 70 (in FIG. 15, the oil in the space 85 is illustrated by the hatched area 500), part of the accumulation of the oil passes through the gaps S70 in the spline-fitting part 70 and reaches the hollow interior 3145 of the rotor shaft 314 (see arrow R506). Depending on the state of oil supply to the space 85, a state in which the top of the accumulation of the oil exceeds the gaps S70 in the spline-fitting part 70 may be maintained. In this case, part of the accumulation of the oil continuously reaches the hollow interior 3145 of the rotor shaft 314 through the gaps S70 in the spline-fitting part 70.

In an example illustrated in FIG. 16, the meshing of the female splines 71 and the male splines 72 in the spline-fitting part 70 is achieved by major diameter fit in which the tips (major diameter surfaces 721) of the male splines 72 are radially brought into contact with the roots (major diameter surfaces 711) of the female splines 71. In this case, the gaps S70 in the spline-fitting part 70 may include circumferential gaps S71 between the teeth and radial gaps S72 between the roots of the male splines 72 and the tips of the female splines 71. In FIG. 16, a line L700 indicating an example of the top of the accumulation of the oil (the height of the accumulation of the oil) when exceeding the gaps S72 is schematically illustrated by a two-dot chain line.

In the modification illustrated in FIG. 17, the meshing of female splines 71A and male splines 72A in the spline-fitting part 70A between the input shaft 31 and the rotor shaft 314A is achieved by side fit. In this case, gaps S70A in the spline-fitting part 70A may include radial gaps S73A between the tips (major diameter surfaces 721A) of the male splines 72A and the roots (major diameter surfaces 711A) of the female splines 71A, and radial gaps S74A between the roots of the male splines 72A and the tips of the female splines 71A. In FIG. 17, a line L702 indicating an example of the top of the accumulation of the oil (the height of the accumulation of the oil) in a state of significantly exceeding the gaps S73A is schematically illustrated by a two-dot chain line.

Here, when the rotary electric machine 1B is driven, the rotor shaft 314 is rotating, and the oil reaching the hollow interior 3145 of the rotor shaft 314 flows along the inner peripheral surface of the rotor shaft 314 by the action of centrifugal force (see arrow R508). When reaching an inlet (radially inner opening) of an oil hole 8311B, the oil flowing along the inner peripheral surface of the rotor shaft 314 is ejected radially outward from an outlet (radially outer opening) of the oil hole 8311B toward the coil turns 3161 of the field windings 316 by the action of centrifugal force (see arrow R510). Similarly, when reaching an inlet (radially inner opening) of an oil hole 8312B, the flow along the inner peripheral surface of the rotor shaft 314 is ejected radially outward from an outlet (radially outer opening) of the oil hole 8312B toward the coil turns 3162 of the field windings 316 by the action of centrifugal force (not illustrated).

When the oil in the hollow interior 3145 of the rotor shaft 314 is thus ejected radially outward by centrifugal force, a negative pressure in the hollow interior 3145 of the rotor shaft 314 increases. Consequently, due to this negative pressure, the flow of the oil through the gaps S70 in the spline-fitting part 70 described above into the hollow interior 3145 of the rotor shaft 314 (see arrow R506) is accelerated. In this way, according to the present embodiment, by utilizing the negative pressure in the hollow interior 3145 of the rotor shaft 314, the flow of the oil through the gaps S70 in the spline-fitting part 70 into the hollow interior 3145 of the rotor shaft 314 (see arrow R506) can be effectively accelerated. As a result, even when the oil is supplied to the hollow interior 3145 of the rotor shaft 314 through the gaps S70 in the spline-fitting part 70, an appropriate amount of oil supply can be provided.

In particular, the negative pressure in the hollow interior 3145 of the rotor shaft 314 increases as the rotational speed of the rotor shaft 314 (that is, the rotational speed of the rotary electric machine 1B) increases. Therefore, a relatively large amount of oil can be thrown onto the field windings 316 at the time of high-speed rotation during which the temperature of the field windings 316 tends to become relatively high.

Further, according to the present embodiment, since the hollow interior 3145 of the rotor shaft 314 is closed at the X-direction X2 side as described above, the negative pressure tends to become higher than when the X-direction X2 side is opened. This can effectively accelerate the flow of the oil through the gaps S70 in the spline-fitting part 70 into the hollow interior 3145 of the rotor shaft 314 (see arrow R506).

In this manner, according to the present embodiment, the oil can be supplied from the X-direction X1 side of the rotor shaft 314 through the space 85 and the spline-fitting part 70 to the hollow interior 3145 of the rotor shaft 314. This can simplify or eliminate the oil passage structure on the X-direction X2 side of the rotor shaft 314. As a result, compared with a conventional technique in which oil is supplied from the X-direction X2 side of the rotor shaft 314 (the non-connected side of the rotary electric machine 1B) (see, for example, Patent Literature 1), space on the X-direction X2 side of the rotor shaft 314 can be saved or increased in the degree of flexibility in use for other purposes. That is, according to the present embodiment, in the vehicle drive unit 100B including the rotary electric machine 1B and the power transmission system 7, space on the non-connected side of the rotary electric machine 1B can be saved or improved in the degree of flexibility in the disposition of other members.

Here, in the present embodiment, the slip rings 318 are provided on the X-direction X2 side of the rotor shaft 314 (the non-connected side of the rotary electric machine 1B). The present embodiment does not include a complicated oil passage structure on the X-direction X2 side of the rotor shaft 314, and thus can easily provide space for disposing the slip rings 318 on the X-direction X2 side of the rotor shaft 314. In particular, the slip rings 318 require high waterproofness (for example, complete waterproofness) and may require a relatively large disposition space. The present embodiment facilitates the provision of such a relatively large disposition space.

Further, according to the present embodiment, oil is supplied to the hollow interior 3145 of the rotor shaft 314 through the gaps S70 in the spline-fitting part 70, so that the oil lubrication of the spline-fitting part 70 can be achieved. That is, oil can be stably supplied as lubricating oil to the spline-fitting part 70, which is a power transmission part, and the reliability (for example, the wear resistance etc.) of the spline-fitting part 70 can be enhanced.

Furthermore, according to the present embodiment, oil is supplied to the hollow interior 3145 of the rotor shaft 314 through the gaps S70 in the spline-fitting part 70, which thus eliminates the need to make the input shaft 31 hollow in contrast to, for example, a conventional configuration (not illustrated) in which oil is supplied to the hollow interior of a rotor shaft through a hollow input shaft. In this case, the processing cost of the input shaft 31 can be reduced as compared with a case where the input shaft 31 is formed by a hollow rotary shaft member (that is, a rotary shaft member having a hollow interior forming an oil passage). In addition, no disadvantages (problems related to the strength/rigidity of the input shaft 31) occur which may occur when the input shaft 31 is made from a hollow rotary shaft member. However, also in the present embodiment, the input shaft 31 may be formed by a hollow rotary shaft member for another purpose, and in this respect, the degree of freedom in the design of the input shaft 31 can be increased.

In the present embodiment, only one oil passage 81 is provided, but two or more oil passages may be provided. Further, in the present embodiment, the oil passage 81 is provided substantially parallel to the vertical direction, but may be provided at an inclination with respect to the vertical direction as long as it is in a direction in which downward gravity acts on the oil.

Figure 18:
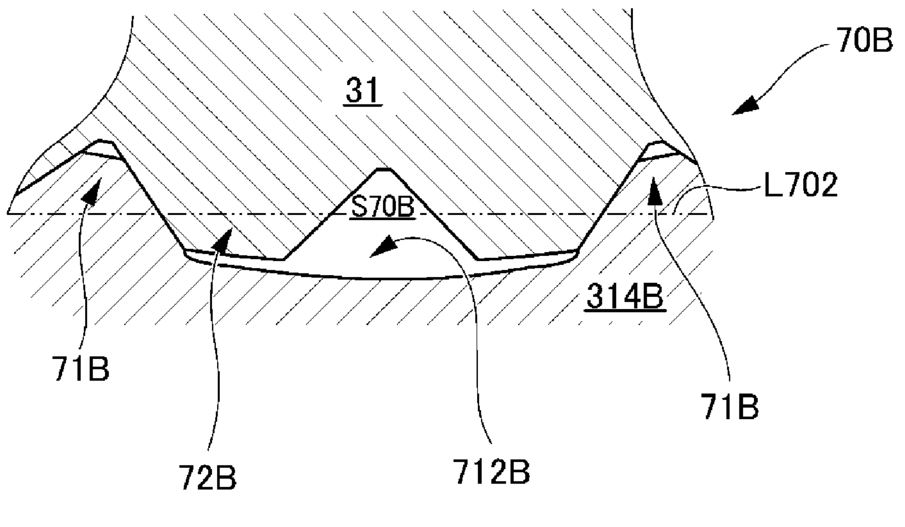
FIG. 18 is a cross-sectional view illustrating part of a spline-fitting part according to another modification.

FIG. 18 is a cross-sectional view illustrating part of a spline-fitting part 70B according to another modification. In an example illustrated in FIG. 18, in the spline-fitting part 70B between the input shaft 31 and a rotor shaft 314B, female splines 71B have a toothless portion 712B. In this case, a gap S70B in the spline-fitting part 70B can be increased by the toothless portion 712B, so that the flow of the oil from the space 85 (see FIG. 15) through the gap S70B into the hollow interior 3145 of the rotor shaft 314B (see arrow R506 in FIG. 15) can be effectively accelerated.

Thus, according to the required amount of oil to be supplied to the hollow interior 3145 of the rotor shaft 314, one or a plurality of toothless portions like the toothless portion 712B may be formed. In the example illustrated in FIG. 18, the female splines 71B have the toothless portion 712B. Instead of or in addition to this, male splines 72B may have a similar toothless portion.

The mode of oil supply through the spline-fitting part 70 according to the third embodiment described above is also applicable to the first and second embodiments described above.

Next, a vehicle drive unit 100C according to another embodiment will be described with reference to FIG. 19. In the following description, components that may be the same as those of the vehicle drive unit 100B according to the above-described embodiment are denoted by the same reference numerals, and description thereof may be omitted.

Figure 19:
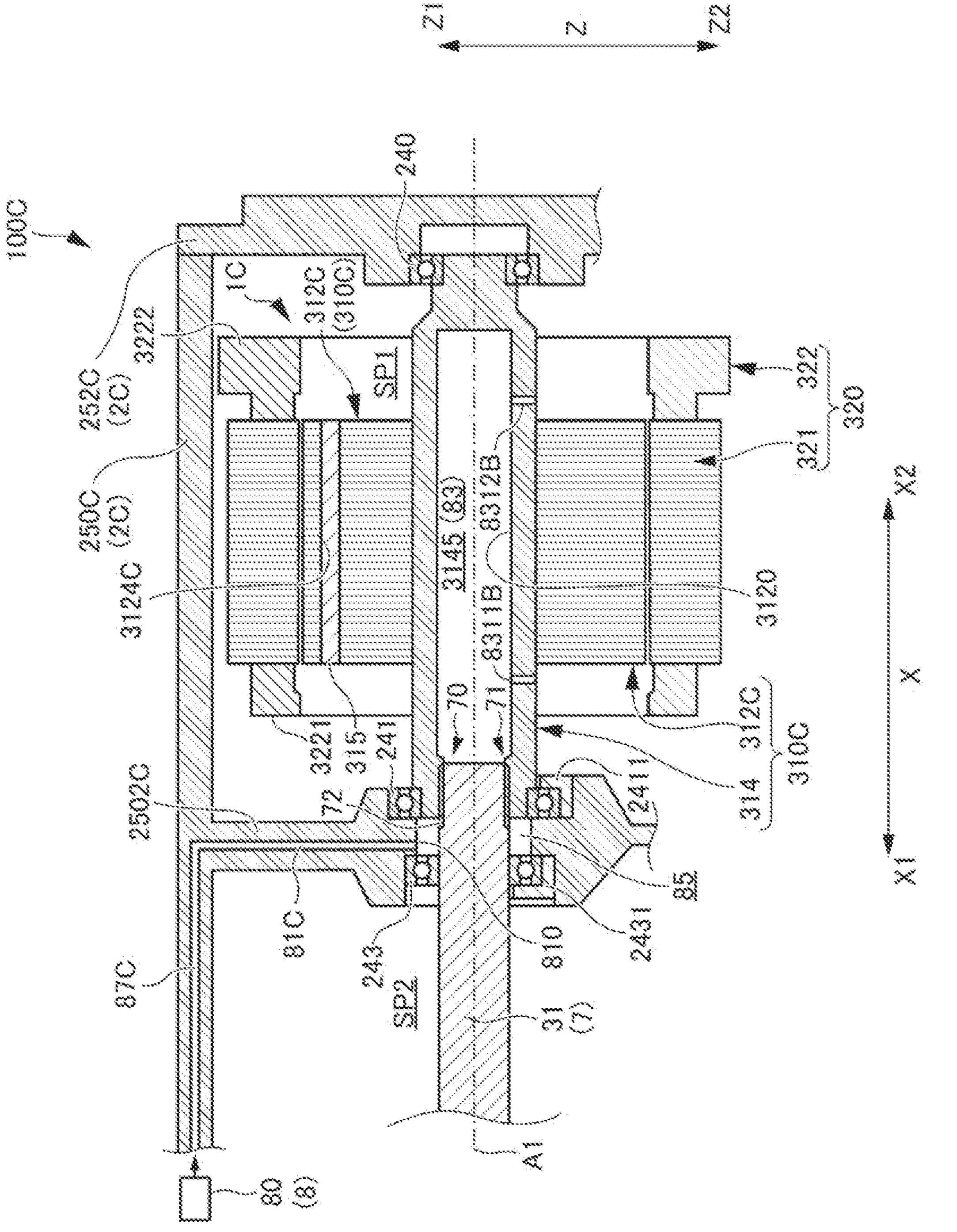
FIG. 19 is a schematic cross-sectional view illustrating a general outline of a rotary electric machine according to another embodiment.

FIG. 19 is a schematic cross-sectional view illustrating a general outline of a rotary electric machine 1C according to the other embodiment. In FIG. 19, as in FIG. 14 described above, part of a case 2C is omitted, and the input shaft 31 and others are also illustrated as components other than the rotary electric machine 1C.

The vehicle drive unit 100C according to the other embodiment is different from the vehicle drive unit 100B according to the above-described embodiment in that the rotary electric machine 1B and the case 2 are replaced with the rotary electric machine 1C and the case 2C, respectively.

The rotary electric machine 1C according to the present embodiment is different from the rotary electric machine 1B according to the above-described embodiment in that it is of an interior permanent magnet type. Specific differences are that the rotor 310 is replaced with a rotor 310C, and the slip rings 318 are omitted.

The rotor 310C is different from the rotor 310 of the above-described embodiment in that the rotor core 312 is replaced with a rotor core 312C, and permanent magnets 315 are provided instead of the field windings 316.

The rotor core 312C is different from the rotor core 312 of the above-described embodiment in that axial magnet holes 3124C into which the permanent magnets 315 are inserted are provided instead of the teeth 3122 around which the field windings 316 are wound.

The permanent magnets 315 are inserted into the magnet holes 3124C in the rotor core 312C. Alternatively, the permanent magnets 315 may be attached to the outer peripheral surface of the rotor core 312C. The arrangement of the permanent magnets (not illustrated) etc. are arbitrary.

The case 2C is different from the case 2 of the above-described embodiment in that the second cover member 253 is eliminated, the motor case 250 is replaced with a motor case 250C, and the first cover member 252 is replaced with a first cover member 252C. The second cover member 253 is omitted as the slip rings 318 are omitted.

The motor case 250C is different from the motor case 250 of the above-described embodiment in that the partition wall 2502 is replaced with a partition wall 2502C, and an axial in-case oil passage 87C is provided.

The partition wall 2502C is different from the partition wall 2502 of the above-described embodiment in that the oil passage 81 is replaced with an oil passage 81C.

The oil passage 81C has substantially the same function as the oil passage 81 of the above-described embodiment, but is different from the oil passage 81 in that it communicates at the upper end with the in-case oil passage 87C. Accordingly, in the present embodiment, the oil passage pipe 82 of the above-described embodiment is omitted. However, also in the present embodiment, the partition wall 2502C may have the same configuration as the partition wall 2502 of the above-described embodiment. In this case, the oil passage pipe 82 may be provided instead of the in-case oil passage 87C.

As illustrated in FIG. 19, the in-case oil passage 87C may be formed to extend axially in a peripheral wall portion of the motor case 250C forming the gear housing chamber SP2. The in-case oil passage 87C is connected at one end on the X-direction X2 side to the oil passage 81C, and communicates at the other end on the X-direction X1 side with the oil pump 80.

The first cover member 252C is changed from the first cover member 252 of the above-described embodiment only in form due to the omission of the slip rings 318, and is not substantially changed. Like the first cover member 252 described above, the first cover member 252C may not include an oil passage structure.

The present embodiment can provide the same effects as the above-described embodiment. That is, the present embodiment also allows the supply of oil from the X-direction X1 side of the rotor shaft 314 through the space 85 and the spline-fitting part 70 to the hollow interior 3145 of the rotor shaft 314. This can simplify or eliminate the oil passage structure on the X-direction X2 side of the rotor shaft 314. As a result, the body size of the rotary electric machine 1C in the X direction can be reduced by saving space on the X-direction X2 side of the rotor shaft 314, as compared with the conventional technique in which oil is supplied from the X-direction X2 side of the rotor shaft 314 (the non-connected side of the rotary electric machine 1B).

In the present embodiment, the oil ejected radially from the oil hole 8311B and the oil hole 8312B individually hits the coil ends 3221 and 3222 of the stator 320 to cool the coil ends 3221 and 3222. In the present embodiment, the oil flowing along the inner peripheral surface of the hollow interior 3145 of the rotor shaft 314 can also contribute to the cooling of the permanent magnets 315.

Although the embodiments have been described in detail above, the present disclosure is not limited to specific embodiments, and various modifications and changes can be made within the scope described in the claims. All or two or more of the components of the above-described embodiments can be combined.

For example, in the first embodiment described above, the oil passage pipes 861 and 862 are provided as a preferable example, but one of the oil passage pipes 861 and 862 may be omitted. The same applies to the other embodiments described above.

REFERENCE SIGNS LIST

1: Rotary electric machine, 310: Rotor, 312: Rotor core (Core member), 314:: Rotor shaft (Shaft), 3145: Hollow interior (Interior), 316: Field winding, 3161, 3162: Coil turn, 313, 313A: End plate (End member), 3134: Wall, 317, 317A: End ring (Cover member), 3170: Peripheral wall, 3172: Annular wall, 31702: Hole (Second hole), 320: Stator, 322: Stator coil (Coil), 3221, 3222: Coil end (Axial end of coil), 3210: Teeth, 8311, 8312: Oil hole (First hole), 834: Oil passage (First coolant flow passage), 8341: First flow passage, 8342: Second flow passage, 8343: Discharge opening, 861, 861A, 862, 862A: Oil passage pipe (First coolant pipe), 8610, 8610A, 8620A, 8620A: Ejection opening (First ejection opening), 81: Oil passage (Second coolant pipe), 81A: Tubular passage (Second coolant pipe), 82: Oil passage pipe (Second coolant pipe), 87A: Tubular passage (Second coolant pipe), 89: Oil passage (Second coolant flow passage), 890: Oil passage (Fourth flow passage), 891: Oil passage (Third flow passage), and 80: Oil pump (Pump)

The invention claimed is:

1. A rotary electric machine, comprising:

a stator including teeth around which coils are wound;

a rotor including a shaft of a hollow shape and a core member around which field windings are wound, the core member being coaxially fixed to the shaft, the rotor being disposed coaxially with the stator with a gap provided radially between the rotor and the stator; and a coolant flow passage structure communicating with a pump that force-feeds a liquid coolant, wherein:

the field windings include coil turns located at axial ends of the rotor, the coolant flow passage structure includes a first coolant flow passage communicating with an interior of the shaft, the first coolant flow passage extends radially outward from the shaft, passing axially inside the coil turns, and has a discharge opening radially facing the stator at a radially outer end, the rotor further includes an end member covering an axial end face of the core member, the end member axially abuts, at part of an axially inner surface, the axial end face of the core member, and contacts, at an axially outer surface, the field windings, the first coolant flow passage is formed between the axially inner surface of the end member and the axial end face of the core member, the end member has an inner diameter side end that contacts the shaft and has a portion that extends radially outward from the inner diameter side end, and in the portion that extends radially outward from the inner diameter side end of the end member, the first coolant flow passage is formed between the axially inner surface of the end member and the axial end face of the core member.

2. The rotary electric machine according to claim 1, wherein the discharge opening radially faces axial ends of the coils of the stator.

3. The rotary electric machine according to claim 1, wherein the first coolant flow passage includes a first flow passage extending annularly, and a plurality of second flow passages extending radially outward from the first flow passage.

4. The rotary electric machine according to claim 3, wherein one or more first holes in a radial direction are formed in an outer peripheral portion of the shaft, and the one or more first holes are continuous with the first flow passage at a radially outer end.

5. The rotary electric machine according to claim 4, wherein the one or more first holes coincide in circumferential position with at least one of the plurality of second flow passages, or are circumferentially offset from the plurality of second flow passages.

6. The rotary electric machine according to claim 1, wherein the coolant flow passage structure further includes a first coolant pipe having a first ejection opening at a position axially facing the coil turns of the field windings, and a second coolant pipe that allows supply of the liquid coolant from an axial end of the shaft to the interior of the shaft, the liquid coolant supplied to the first coolant pipe is ejected axially from the first ejection opening of the first coolant pipe, and the liquid coolant supplied to the second coolant pipe is supplied to the stator through the first coolant flow passage.

7. The rotary electric machine according to claim 6, wherein the rotor further includes a cover member of a cylindrical shape covering the coil turns and the end member from radially outside, and the first ejection opening of the first coolant pipe faces an axial end face of the cover member.

8. The rotary electric machine according to claim 6, wherein the rotor further includes a cover member of a cylindrical shape covering the coil turns and the end member from radially outside, the liquid coolant ejected axially from the first ejection opening is ejected from the first ejection opening to the coil turns, one or more first holes in a radial direction are formed in an outer peripheral portion of the shaft, and the liquid coolant ejected from the first ejection opening to the coil turns and the liquid coolant ejected from the first holes to the coil turns are supplied to axial ends of the coils of the stator through a second coolant flow passage formed by a gap between the coil turns or the end member and the cover member.

9. The rotary electric machine according to claim 8, wherein the cover member includes a peripheral wall extending in a circumferential direction and an axial direction radially outside the coil turns, and an annular wall extending radially inward from an axial end of the peripheral wall, the annular wall axially faces the coil turns from axially outside, and the second coolant flow passage includes a third flow passage formed by a gap between the annular wall and the coil turns in the axial direction.

10. The rotary electric machine according to claim 9, wherein the first ejection opening of the first coolant pipe is located radially inside the annular wall.

11. The rotary electric machine according to claim 9, wherein the end member includes a wall erected in the axial direction to radially face the coil turns from radially outside, the cover member has a second hole in the radial direction at a position radially facing the axial ends of the coils of the stator, the second coolant flow passage includes a fourth flow passage formed by a gap between the peripheral wall and the wall in the radial direction, and the fourth flow passage communicates at one end with the third flow passage and communicates at an opposite end with the second hole in the cover member.

12. The rotary electric machine according to claim 10, wherein the end member includes a wall erected in the axial direction to radially face the coil turns from radially outside, the cover member has a second hole in the radial direction at a position radially facing the axial ends of the coils of the stator, the second coolant flow passage includes a fourth flow passage formed by a gap between the peripheral wall and the wall in the radial direction, and the fourth flow passage communicates at one end with the third flow passage and communicates at an opposite end with the second hole in the cover member.

* * * * *